(12) United States Patent
Nevitt et al.

(10) Patent No.: US 10,162,218 B2
(45) Date of Patent: Dec. 25, 2018

(54) ILLUMINATION SYSTEMS WITH SLOPED TRANSMISSION SPECTRUM FRONT REFLECTOR

(71) Applicant: 3M Innovative Properties Company, St. Paul, MN (US)

(72) Inventors: Timothy J. Nevitt, Red Wing, MN (US); Michael F. Weber, Shoreview, MN (US); John A. Wheatley, Lake Elmo, MN (US); Matthew E. Sousa, Eagan, MN (US); Tao Liu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 110 days.

(21) Appl. No.: 15/250,712

(22) Filed: Aug. 29, 2016

(65) Prior Publication Data
US 2016/0370653 A1 Dec. 22, 2016

Related U.S. Application Data

(63) Continuation of application No. 14/352,860, filed as application No. PCT/US2012/060483 on Oct. 17, 2012, now Pat. No. 9,441,809.
(Continued)

(51) Int. Cl.
*G02F 1/1335* (2006.01)
*F21V 8/00* (2006.01)
(Continued)

(52) U.S. Cl.
CPC .......... *G02F 1/133605* (2013.01); *F21V 7/04* (2013.01); *F21V 13/08* (2013.01);
(Continued)

(58) Field of Classification Search
CPC ......... G02F 1/133605; G02F 1/133603; G02F 1/133615; G02B 6/0055; G02B 6/0096; G02B 5/305; F21V 7/04; F21V 13/06
(Continued)

(56) References Cited

U.S. PATENT DOCUMENTS

| 5,442,467 A | 8/1995 | Silverstein |
| 5,734,457 A | 3/1998 | Mitsui |

(Continued)

FOREIGN PATENT DOCUMENTS

| EP | 0835464 | 4/1998 |
| JP | 10-39132 | 2/1998 |

(Continued)

OTHER PUBLICATIONS

Kyu, "Comparison and Analysis of Off-Axis Color Shift Properties of Compensated Liquid Crystal Devices", Japanese Journal of Applied Physics, 2007, vol. 46, No. 12, pp. 7755-7762.
(Continued)

*Primary Examiner* — Laura Tso
(74) *Attorney, Agent, or Firm* — Michael Stern

(57) ABSTRACT

A backlight includes a front and back reflector forming a light recycling cavity and one or more light source members disposed to emit light into the light recycling cavity. The front reflector being partially reflective to provide an output illumination area. The front reflector has a blue sloped transmission spectra, at normal incidence with a range among bin values from 15% to 100%.

6 Claims, 24 Drawing Sheets

Related U.S. Application Data

(60) Provisional application No. 61/549,588, filed on Oct. 20, 2011.

(51) Int. Cl.
*F21V 7/04* (2006.01)
*F21V 13/08* (2006.01)
*G02B 5/30* (2006.01)

(52) U.S. Cl.
CPC ......... *G02B 6/0055* (2013.01); *G02B 6/0096* (2013.01); *G02F 1/133603* (2013.01); *G02F 1/133615* (2013.01); *G02B 5/305* (2013.01)

(58) Field of Classification Search
USPC ....................................................... 362/97.2
See application file for complete search history.

(56) References Cited

U.S. PATENT DOCUMENTS

| | | | |
|---|---|---|---|
| 5,882,774 A | 3/1999 | Jonza | |
| 6,157,490 A | 12/2000 | Wheatley | |
| 6,352,761 B1 | 3/2002 | Hebrink | |
| 6,774,963 B1 | 8/2004 | Nako | |
| 6,783,349 B2 | 8/2004 | Neavin | |
| 6,967,778 B1 | 11/2005 | Wheatley | |
| 7,229,198 B2 | 6/2007 | Sakai | |
| 8,075,148 B2 | 12/2011 | Nada | |
| 8,096,668 B2 | 1/2012 | Abu-Ageel | |
| 8,469,575 B2 | 6/2013 | Weber | |
| 8,523,419 B2 | 9/2013 | Nevitt | |
| 8,807,774 B2 | 8/2014 | Wheatley | |
| 8,848,132 B2 | 9/2014 | O'Neill | |
| 8,926,159 B2 * | 1/2015 | Nevitt | G02B 6/0068 362/301 |
| 9,091,408 B2 * | 7/2015 | Weber | G02B 6/0055 |
| 9,441,809 B2 * | 9/2016 | Nevitt | G02B 6/0055 |
| 2008/0002256 A1 * | 1/2008 | Sasagawa | G02B 5/0226 359/487.03 |
| 2010/0156953 A1 | 6/2010 | Nevitt | |
| 2010/0165660 A1 | 7/2010 | Weber | |
| 2010/0182532 A1 * | 7/2010 | Lin | G02B 5/045 349/61 |
| 2011/0096529 A1 | 4/2011 | Wheatley | |
| 2011/0134659 A1 | 6/2011 | Aastuen | |
| 2011/0272849 A1 | 11/2011 | Neavin | |
| 2015/0378077 A1 * | 12/2015 | Haag | G02B 5/3041 362/19 |

FOREIGN PATENT DOCUMENTS

| | | |
|---|---|---|
| WO | WO 2008-144636 | 11/2008 |
| WO | WO 2010-120971 | 10/2010 |
| WO | WO 2011-050226 | 4/2011 |
| WO | WO 2011-050233 | 4/2011 |
| WO | WO 2011-050268 | 4/2011 |
| WO | WO 2011-139618 | 11/2011 |
| WO | WO 2011-146288 | 11/2011 |
| WO | WO 2013-059228 | 4/2013 |
| WO | WO 2013-059231 | 4/2013 |

OTHER PUBLICATIONS

Shrenk, "Nano polymeric optical films", Tappi Journal, Jun. 1992, pp. 169-174.
International Search Report for International PCT Application No. PCT/US2012/060483 dated Mar. 6, 2013, 7 pages.

* cited by examiner

ILLUMINATION SYSTEMS WITH SLOPED TRANSMISSION SPECTRUM FRONT REFLECTOR

This application is a continuation of U.S. patent application Ser. No. 14/352,860, filed Apr. 18, 2014, which is a 371 application of international Application No. PCT/US2012/060483, filed Oct. 17, 2012, which claims the benefit of U.S. Provisional Patent Application 61/549,588, filed Oct. 20, 2011, the entire contents of each of which is incorporated herein by reference.

FIELD

The present disclosure relates to, among other things, extended area illumination systems suitable for illuminating a display or other graphic from behind, commonly referred to as backlights, as well as similar extended area lighting devices, sometimes referred to as luminaires. The present disclosure is particularly applicable to luminaires and backlights that include a front and back reflector, between which is formed a hollow light recycling cavity.

BACKGROUND

Backlights can be considered to fall into one of two categories depending on where the internal light sources are positioned relative to the output area of the backlight, where the backlight "output area" corresponds to the viewable area or region of a luminaire or backlit display device. The "output area" of a backlight is sometimes referred to herein as an "output region" or "output surface" to distinguish between the region or surface itself and the area (the numerical quantity having units of square meters, square millimeters, square inches, or the like) of that region or surface.

A first category is "edge-lit" backlights. In an edge-lit backlight, one or more light sources are disposed—from a plan-view perspective—along an outer border or periphery of the backlight construction, generally outside the area or zone corresponding to the output area. Often, the light source(s) are shielded from view by a frame or bezel that borders the output area of the backlight. The light source(s) emit light into a component referred to as a "light guide," particularly in cases where a very thin profile backlight is desired, as in laptop computer displays. The light guide is a clear, solid, and relatively thin plate whose length and width dimensions are on the order of the backlight output area. The light guide uses total internal reflection (TIR) to transport or guide light from the edge-mounted lamps across the entire length or width of the light guide to the opposite edge of the backlight, and a non-uniform pattern of localized extraction structures is provided on a surface of the light guide to redirect some of this guided light out of the light guide toward the output area of the backlight. Such backlights can also include light management films, such as a reflective material disposed behind or below the light guide, diffusive films, reflective polarizing film and prismatic BEF film(s) disposed in front of or above the light guide to increase on-axis brightness.

The second category is "direct-lit" backlights. In a direct-lit backlight, one or more light sources are disposed—from a plan-view perspective—substantially within the area or zone corresponding to the output area, normally in a regular array or pattern within the zone. Alternatively, one can say that the light source(s) in a direct-lit backlight are disposed directly behind the output area of the backlight. A strongly diffusing plate is mounted above the light sources to spread light over the output area. Again, light management films, such as diffuser films, a reflective polarizer film and prismatic BEF film(s), can also be placed atop the diffuser plate for improved on-axis brightness and efficiency.

Backlights of one type or another are often used with liquid crystal (LC)-based displays. Liquid crystal display (LCD) panels, because of their method of operation, utilize only one polarization state of light, and hence for LCD applications it may be important to know the backlight's brightness and uniformity for light of the correct or useable polarization state, rather than simply the brightness and uniformity of light that may be unpolarized. In that regard, with all other factors being equal, a backlight that emits light predominantly or exclusively in the useable polarization state is more efficient in an LCD application than a backlight that emits unpolarized light. Nevertheless, backlights that emit light that is not exclusively in the useable polarization state, even to the extent of emitting randomly polarized light, are still fully useable in LCD applications, since the non-useable polarization state can be easily eliminated by an absorbing polarizer provided at the back of the LCD panel. Such backlights that emit randomly polarized light are often preferred for backlighting of graphic display and signage, which do not have a preferred polarization of illumination light. Drawbacks or limitations of existing direct-lit and edge-lit backlights can include inefficiencies associated with the light management film stacks required for spatial uniformity of brightness on the output area (surface), for light collimation, and in some instances, for output light polarization control. The backlight system described herein may provide one or more advantages over prior backlight systems.

BRIEF SUMMARY

The present disclosure describes recycling backlights with front surface output areas that include apodized broadband reflectors with one or more differing optical packets, exhibiting smooth, and in some instances, sloped, transmission spectra, among other things.

The present application discloses, inter alia, reflective and/or transmissive films, surfaces, or other components that have a defined combination of diffuse and specular, transmission and reflection characteristics. When a partial reflector (front surface) that has a high value of hemispheric reflectivity ($R^f_{hemi}$), is properly placed within a suitable recycling cavity backlight it can improve the output properties of the backlight and allow for the construction of backlights in new design spaces In many embodiments, backlights include a front and back reflector forming a light recycling cavity, the front reflector being partially transmissive with smooth and sloped visible-band transmission spectra, providing an output illumination area, and one or more light sources disposed to emit light into the light recycling cavity. Significantly, the backlights may have an edge-lit configuration into a light guide plate with a variety of "extraction" features, or a direct-lit configuration, or in some combination of both.

In such cases, the front surface partial reflector of the recycling cavity has a reflectivity that generally increases with angle of incidence, and a transmission that generally decreases with angle of incidence. Such reflectivity and transmission may be for unpolarized visible light in any plane of incidence, or for light of a useable polarization state incident in a plane for which oblique light of the useable polarization state is p-polarized, or an orthogonal plane for which oblique light of the useable polarization state is s-polarized.

The advantageous use of front surface partial reflectors with sloped, visible transmission spectra in a recycling backlight is disclosed. The apodized broadband partial reflectors (ABPR) described in Ser. No. 61/549,614 provide a smooth spectrum for the in-band transmitted and reflected light, for example. Sloped in-band transmission and reflection spectra can be generated with a carefully tailored layer thickness profile. A discussion of layer thickness control, so as to provide smooth spectral reflectivity and transmission for optical films, is provided in PCT publication WO 2008/144636 (Weber et al.).

In many embodiments, it is desirable to provide very high recycling cavities, where the front reflector has a hemispherical reflectivity (an appropriate average across the visible band) for visible unpolarized light of $R^f_{hemi}$, the back reflector has a hemispherical reflectivity for visible unpolarized light of $R^b_{hemi}$, and the product $R^f_{hemi}*R^b_{hemi}$ is at least 65%. For example, if the back reflector has an $R^b_{hemi}$ of 98%, then the front reflector has an $R^f_{hemi}$ of at least 66.3%. If the front reflector is optionally fabricated to reflect and transmit different polarization states differently, it may then have a hemispherical reflectivity for visible light of a first polarization state of 98%, and a hemispherical reflectivity for visible light of a second polarization state (e.g., the useable polarization state) orthogonal to the first polarization state of 33%. In such a case, the second or useable polarization state is predominantly reflected by the front reflector even though it is preferentially transmitted in comparison to the first polarization state.

In many embodiments, it is desirable to ensure that the amount of light transmitted through the front reflector is substantially greater than the amount of light transmitted or otherwise lost (e.g., by absorption) by the back reflector. In some embodiments, back reflectors have a high hemispherical reflectivity for visible light, which can be significantly higher than the front reflector. Besides the front and back reflectors, highly reflective and low loss side reflectors can be provided to yield a substantially closed or sealed reflecting cavity, and losses associated with the light sources are kept to minimal levels by, for example, maintaining a very small ratio of collective source area to backlight output area. In some instances, highly reflective and low loss side reflectors can aid in the lateral and transverse transport and mixing of light in a highly recycling cavity.

In other embodiments, a recycling backlight that emits light from both a front surface, and a rear surface, may be desirable. In this instance, the recycling backlight may be formed with two opposing partial reflectors, each having the property of being partially transmissive with smooth and sloped visible-band transmission spectra, and each having high value of hemispheric reflectivity ($R_{hemi}$). Such a two-sided emission surface backlight, when edge-lit using either a solid light guide, or a hollow cavity, can provide lateral and transverse light transport and mixing of light, with the advantage of enabling a 2-sided graphic sign or LC display. It is desirable for such an embodiment to provide very high recycling, where the output-surface partial reflectors have a hemispherical reflectivity for visible unpolarized light of $R^1_{hemi}$, and $R^2_{hemi}$, and the product $R^1_{hemi}*R^2_{hemi}$ is at least 65%.

In some embodiments, a front reflector with a blue-sloped transmission spectrum can provide enhanced collimation and enhanced brightness for preferred view angles when used in a recycling backlight. The blue-sloped front reflector can be a mirror, or it can be an asymmetric reflector with higher transmission for light polarized on one axis compared to the other axis. The blue-sloped front reflector transmission spectrum can be for light polarized parallel to either axis, or for the total transmission of the film. For lighting systems, the output can be polarized or unpolarized. For LCD displays, or any lighting system that requires a substantially polarized output, the highest efficiency is attained when the light transmitted through the blue sloped spectrum, is polarized parallel to the preferred axis for the display application These and other advantages of the various embodiments of the devices and methods described herein will be readily apparent to those of skill in the art upon reading the disclosure presented herein.

BRIEF DESCRIPTION OF THE DRAWINGS

The disclosure may be more completely understood in consideration of the following detailed description of various embodiments of the disclosure in connection with the accompanying drawings, in which:

FIG. 12b is an exploded view of the lines graphed on FIG. 12a;

FIG. 15b is an exploded view of the lines graphed on FIG. 15a;

FIG. 18b is an exploded view of the lines graphed on FIG. 18a;

FIG. 21b is an exploded view of the lines graphed on FIG. 21a.

Figure 1:
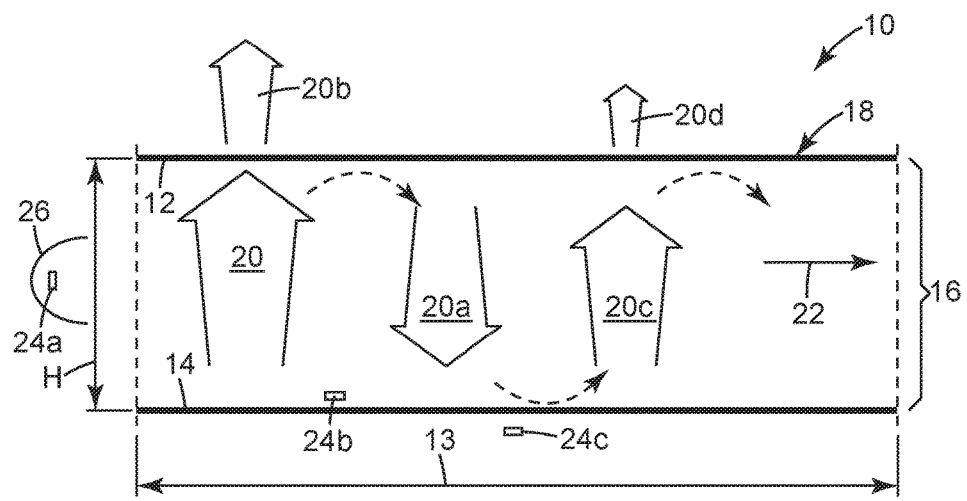
FIG. 1 is a schematic cross sectional view of an exemplary generalized backlight.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," "below," and other directions and orientations are described herein for clarity in reference to the figures and are not to be limiting of an actual device or system or use of the device or system. Many of the devices, articles or systems described herein may be used in a number of directions and orientations.

The present disclosure describes, among other things, illumination systems that include a front and back reflector forming a light recycling cavity, the front broadband reflector can be an apodized broadband partial reflector with differing optical packets to provide an output illumination area, and one or more light sources disposed to emit light into the light recycling cavity. Such illumination systems can be used a luminaires, providing targeted light distribution in work and living spaces. Exemplary illumination systems also include touch screen displays, transflective displays, for phone, mobile, tablet, notebook, monitor and the like applications. While the present disclosure is not so limited, an appreciation of various aspects of the disclosure will be gained through a discussion of the examples provided below.

Backlights for LCD panels, in their simplest form, consist of light generation surfaces, such as the active emitting surfaces of LED dies, the outer layers of phosphor in a CCFL bulb, or other solid state phosphor light sources such a quantum dots, and a geometric and optical arrangement of distributing or spreading this light in such a way as to produce an extended- or large-area illumination surface or region, referred to as the backlight output area, which is spatially uniform in its emitted brightness. Generally, this process of transforming very high brightness local sources of light into a large-area uniform output surface results in a loss of light because of interactions with all of the backlight cavity surfaces, and interaction with the light-generation surfaces. To a first approximation, any light that is not delivered by this process through the output area or surface associated with a front partial reflector—optionally into a desired application viewer-cone (if any), and with a particular (e.g., LCD-useable) polarization state (if any)—is "lost" light.

Referring to a generalized backlight 10 shown in FIG. 1, a front reflector 12 and a back reflector 14 form a hollow light recycling cavity 16. The backlight 10 emits light over an extended output area or surface 18, which in this case corresponds to an outer major surface of the front reflector 12. The front and back reflectors are shown plane and parallel to each other, and coextensive over a transverse dimension 13, which dimension also corresponds to a transverse dimension such as a length or width of the output area 18. The front reflector reflects a substantial amount of light incident upon it from within the cavity, as shown by an initial light beam 20 being reflected into a relatively strong reflected beam 20a and a relatively weaker transmitted beam 20b. Note that the arrows representing the various beams are schematic in nature, e.g., the illustrated propagation directions and angular distributions of the different beams are not intended to be completely accurate.

Reflected beam 20a is strongly reflected by back reflector 14 into a beam 20c. Beam 20c is partially transmitted by front reflector 12 to produce transmitted beam 20d, and partially reflected to produce another beam (not shown). The multiple reflections between the front and back reflectors help to support transverse propagation of light within the cavity, indicated by arrow 22. The totality of all transmitted beams 20b, 20d, and so on add together incoherently to provide the backlight output.

For illustrative purposes, small area light sources 24a, 24b, 24c are shown in alternative positions in the figure, where source 24a is shown in an edge-lit position and is provided with a reflective structure 26 that can help to collimate (at least partially) light from the source 24a, or alternatively to help couple the light into a light guiding structure, such as a light-guide plate 21 (not shown), with spatially distributed extraction features. Sources 24b and 24c are shown in direct-lit positions, and source 24c would generally be aligned with a hole or aperture (not shown) provided in the back reflector 14 to permit light injection into the cavity 16. Reflective side surfaces (not shown, other than reflective structure 26) would typically also be provided generally at the endpoints of dimension 13, preferably connecting the front and back reflectors 12, 14 in a sealed fashion for minimum losses. In some direct-lit embodiments, generally vertical reflective side surfaces may actually be thin partitions that separate the backlight from similar or identical neighboring backlights, where each such backlight is actually a portion of a larger zoned backlight. Light sources in the individual sub-backlights can be turned on or off in any desired combination to provide patterns of illuminated and darkened zones for the larger backlight. Such zoned backlighting can be used dynamically to improve contrast and save energy in some LCD applications.

A backlight cavity, or more generally any lighting cavity, that converts line or point sources of light into uniform extended area sources of light can be made using a combination of reflective and transmissive optical components. In many cases, the desired cavity is very thin compared to its lateral dimension. In many embodiments, these cavities for providing uniform extended area light sources are those that create multiple reflections that both spread the light laterally and randomize the light ray directions.

Solid light guides have generally been used for the thinnest backlights and, provide low loss transport of light and specular reflections at the top and bottom surfaces of the light guide via the phenomenon of total internal reflection (TIR) of light. The specular reflection of light can provide efficient lateral transport of light within a backlight cavity. Extractors placed on the top or bottom surface of a solid light guide redirect the light in order to direct it out of the light guide, creating in essence, a partial reflector.

In many embodiments, the front reflector of the recycling cavity has a reflectivity that generally increases with angle of incidence, and a transmission that generally decreases with angle of incidence, where the reflectivity and transmission are for unpolarized visible light and for any plane of incidence, and/or for light of a useable polarization state incident in a plane for which oblique light of the useable polarization state is p-polarized, for one plane of reference, and s-polarized for the orthogonal plane of reference. Further, the front reflector preferably has a high value of hemispheric reflectivity $R^f_{hemi}$, and while also having a sufficiently high transmission of application-useable light.

In many embodiments, front reflectors have a relatively high overall reflectivity to support relatively high recycling within the cavity. We characterize this in terms of "hemispheric reflectivity," meaning the total reflectivity of a component (whether a surface, film, or collection of films) when light (of a wavelength range of interest) is incident on it across a distribution of all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light for the wavelength range of interest yields the hemispheric reflectivity, $R_{hemi}$. Characterizing a reflector in terms of its $R_{hemi}$ is especially convenient for recycling cavities because light is generally incident on the internal surfaces of the cavity—whether the front reflector, back reflector, or side reflectors—from a distribution across all angles. In addition $R_{hemi}$ is characterized at discrete wavelengths, and may be further taken as an average-value across a range of wavelengths of interest. Further, unlike the reflectivity for normal incidence, $R_{hemi}$ is insensitive to, and already takes into account, the variability of reflectivity with incidence angle, which may be very significant for some components (e.g., prismatic films).

In fact, some embodiments of front reflectors exhibit a (direction-specific) reflectivity that increases with incidence angle away from the normal (and a transmission that generally decreases with angle of incidence), at least for light incident in one plane. Such reflective properties cause the light to be preferentially transmitted from the recycling cavity, out through the front reflector at angles closer to the normal, i.e., closer to the viewing axis of the backlight, and this helps to increase the perceived brightness of the display at viewing angles that are important in the display industry (at the expense of lower perceived brightness at higher viewing angles, which are usually less important). This effect is termed collimation. We say that the increasing reflectivity with angle behavior is "at least for light incident in one plane," because sometimes a narrow viewing angle (more collimation) is desired for only one viewing plane, and a wider viewing angle (less collimation) is desired in the orthogonal plane. An example is some LCD TV applications, where a wide viewing angle is desired for viewing in the horizontal plane, but a narrower viewing angle is specified for the vertical plane. In other cases, narrow angle viewing is desirable in both orthogonal planes so as to maximize on-axis brightness. In this manner, light from the recycling cavity can be collimated to a significant degree, and a polarized light output from a single film construction can be provided.

In the following discussion of reflectivity and transmission characteristics we can initially assume reflectivity and transmission are determined as broad averages across a range of wavelengths. Later discussion will focus on sloped transmission and reflection spectra across the visible band, and reflectivity and transmission characteristics are wavelength dependent and need to be characterized within specific wavelength regions.

Figure 2:
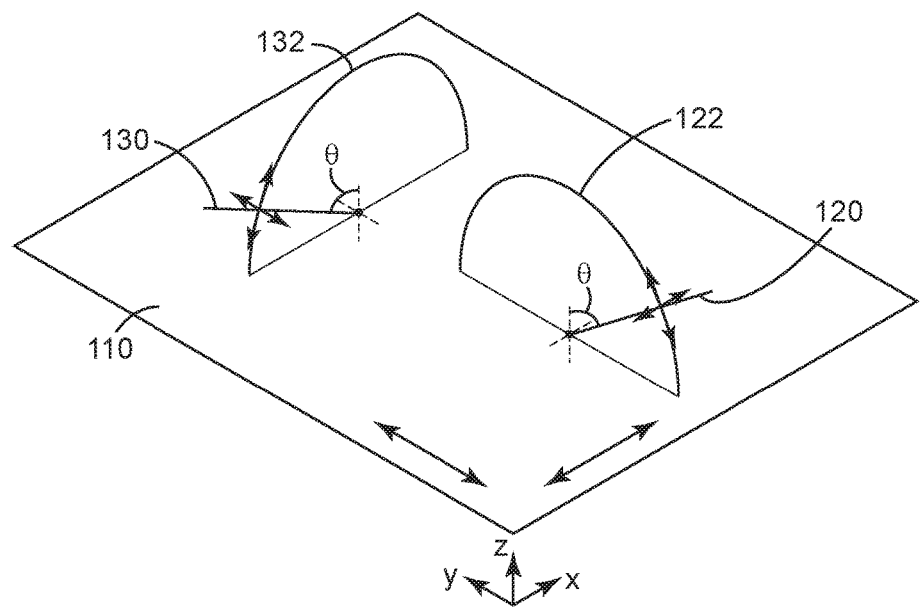
FIG. 2 is a schematic perspective view a reflective polarizing film.

As we discuss oblique angle reflectivity, it is helpful to keep in mind the geometrical considerations of FIG. 2. There, we see a surface 110 that lies in an x-y plane, with a z-axis normal direction. If the surface is a polarizing film or partially polarizing film (such as the ABPR as described in Ser. No. 61/549,614) we designate for purposes of this application the y-axis as the "pass axis" and the x-axis as the "block axis." In other words, if the film is a polarizing film, normally incident light whose polarization axis is parallel to the y-axis is preferentially transmitted compared to normally incident light whose polarization axis is parallel to the x-axis. Of course, in general, the surface 110 need not be a polarizing film.

Light can be incident on surface 110 from any direction, but we concentrate on a first plane of incidence 132, parallel to the x-z plane, and a second plane of incidence 122, parallel to the y-z plane. "Plane of incidence" refers to a plane containing the surface normal and a particular direction of light propagation. We show in FIG. 2 one oblique light ray 130 incident in the plane 132, and another oblique light ray 120 incident in the plane 122. Assuming the light rays to be unpolarized, they will each have a polarization component that lies in their respective planes of incidence (referred to as "p-polarized" light), and an orthogonal polarization component that is oriented perpendicular to the respective plane of incidence (referred to as "s-polarized light" and labeled "s" in FIG. 2). It is important to note that for polarizing surfaces, "s" and "p" can be aligned with either the pass axis or the block axis, depending on the direction of the light ray. In FIG. 2, the s-polarization component of ray 130, and the p-polarization component of ray 120, are aligned with the pass axis (the y-axis) and thus would be preferentially transmitted, while the opposite polarization components (p-polarization of ray 130, and s-polarization of ray 120) are aligned with the block axis (x-axis).

With this in mind, let us consider the meaning of specifying (if we desire) that the front reflector "exhibit a reflectivity that generally increases with angle of incidence," in the case where the front reflector is an ABPR as described in Ser. No. 61/549,614. For an instance where a light of a preferred polarization is desirable, the ABPR includes a multilayer construction (e.g., coextruded polymer microlayers that have been oriented under suitable conditions to produce desired refractive index relationships and desired reflectivity characteristics) having a very high reflectivity for normally incident light in the block polarization state and a lower but still substantial reflectivity (e.g., 20% to 90%) for normally incident light in the pass polarization state. The very high reflectivity of block-state light (p-polarized component of ray 130, and s-polarized component of ray 120) generally remains very high for all incidence angles. The more interesting behavior is for the pass-state light (s-polarized component of ray 130, and p-polarized component of ray 120), since that exhibits an intermediate reflectivity at normal incidence. Oblique pass-state light in the plane of incidence 132 will exhibit an increasing reflectivity with increasing incidence angle due to the nature of s-polarized light reflectivity (the relative amount of increase, however, will depend on the initial value of pass-state reflectivity at normal incidence). Thus, light emitted from a recycling backlight with an ABPR front film in a viewing plane parallel to plane 132 will be partially collimated or confined in angle. Oblique pass-state light in the other plane of incidence 122 (i.e., the p-polarized component of ray 120), however, can exhibit any of three behaviors depending on the magnitude and polarity of the z-axis refractive index difference between microlayers relative to the in-plane refractive index differences. See, e.g., U.S. Pat. No. 5,882,774.

In one case, a Brewster angle exists, and the reflectivity of this light decreases with increasing incidence angle. This produces bright off-axis lobes in a viewing plane parallel to plane 122, which are usually undesirable in LCD viewing applications (although in other applications this behavior may be acceptable, and even in the case of LCD viewing applications this lobed output may be redirected towards the viewing axis with the use of a prismatic film and such).

In another case, a Brewster angle does not exist or is very large, and the reflectivity of the p-polarized light is relatively constant with increasing incidence angle. This produces a relatively wide viewing angle in the referenced viewing plane.

In the third case, no Brewster angle exists, and the reflectivity of the p-polarized light increases significantly with incidence angle. This can produce a relatively narrow viewing angle in the referenced viewing plane, where the degree of collimation is tailored at least in part by controlling the magnitude of the z-axis refractive index difference between microlayers in the ABPR.

Of course, the reflective surface 110 need not have asymmetric on-axis polarizing properties as with ABPR. Symmetric multilayer reflectors, for example, can be designed to have a high reflectivity but with substantial transmission by appropriate choice of the number of microlayers, layer thickness profile, refractive indices, and so forth. In such a case, the s-polarized components of both ray 130 and 120 will increase with incidence angle, in the same manner with each other. Again, this is due to the nature of s-polarized light reflectivity, but the relative amount of increase will depend on the initial value of the normal incidence reflectivity. The p-polarized components of both ray 130 and ray 120 will have the same angular behavior as each other, but this behavior can be controlled to be any of the three cases mentioned above by controlling the magnitude and polarity of the z-axis refractive index difference between microlayers relative to the in-plane refractive index differences, as discussed, e.g., in U.S. Patent Publication No. 2010-0165660.

Thus, the increase in reflectivity with incidence angle (if present) in the front reflector can refer to light of a useable polarization state incident in a plane for which oblique light of the useable polarization state is p-polarized for an incidence plane, and s-polarized for the orthogonal incidence plane. Alternately, such increase in reflectivity can refer to the average reflectivity of unpolarized light in any plane of incidence.

In many embodiments, the front reflectors of a recycling cavity, also have a sloped transmission spectrum, and often a blue-sloped transmission spectrum for light incident in both planes of incidence for either a usable polarization state, or for unpolarized light in any plane of incidence. Our discussion of "sloped" transmission spectra will refer to FIGS. 3 and 4.

Figure 3:
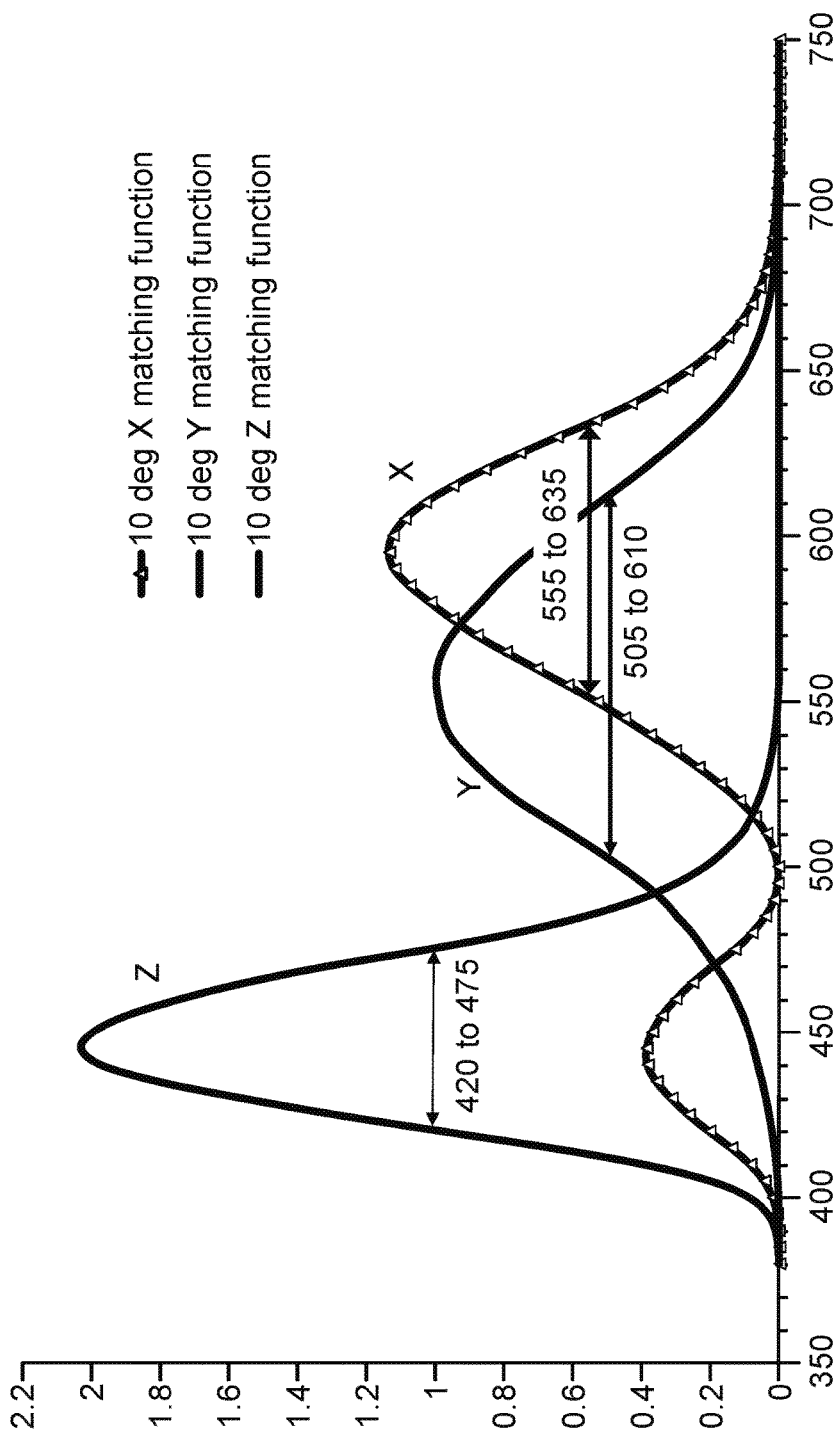
FIG. 3 is a RGB Color Matching Function (CIE 1931) for the human eye response to light in the visible wavelength range.
Figure 4A:
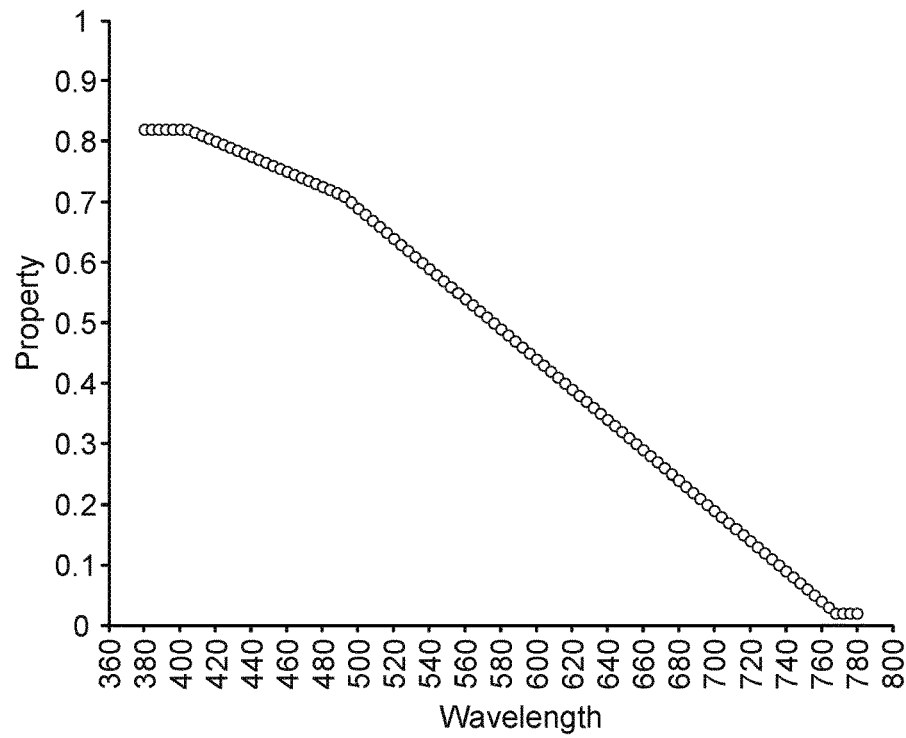
FIGS. 4a-4e are graphs illustrating quantitative definition for spectra slope.
Figure 4B:
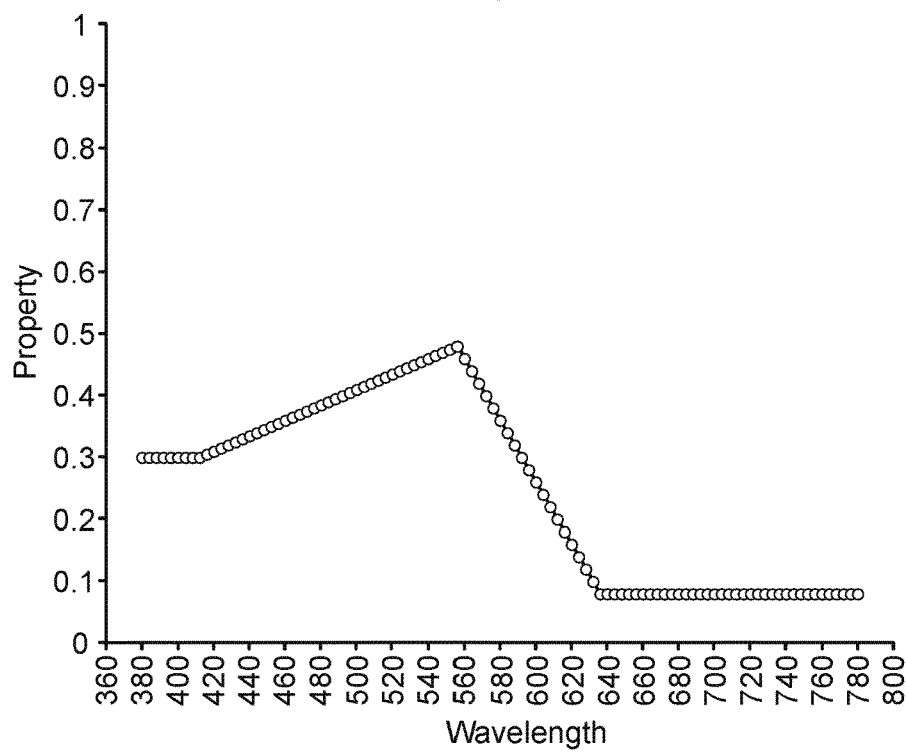
Figure 4C:
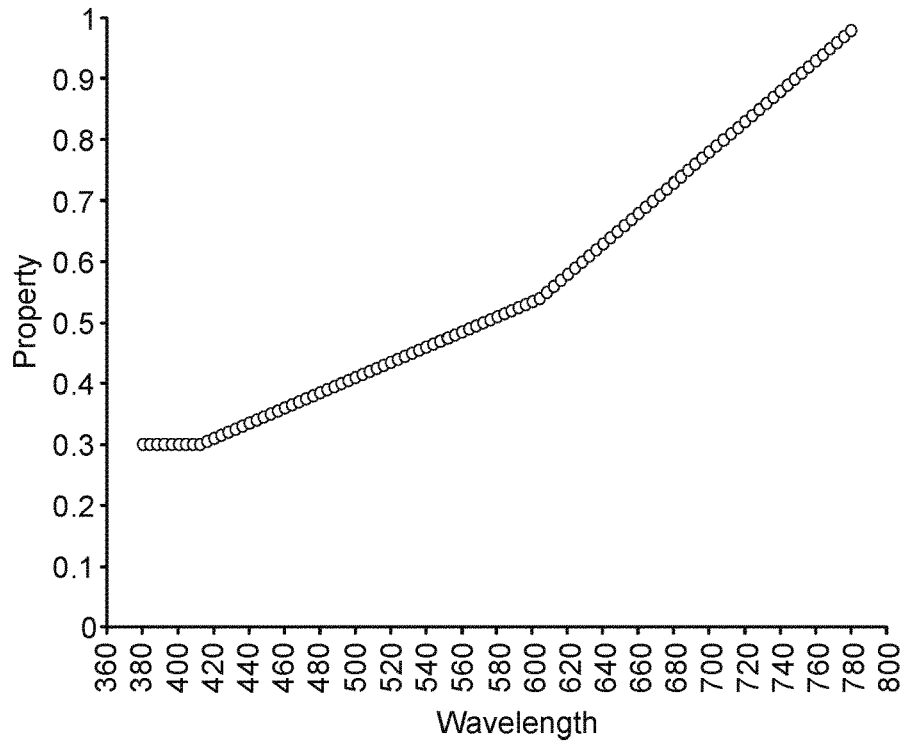
Figure 4D:
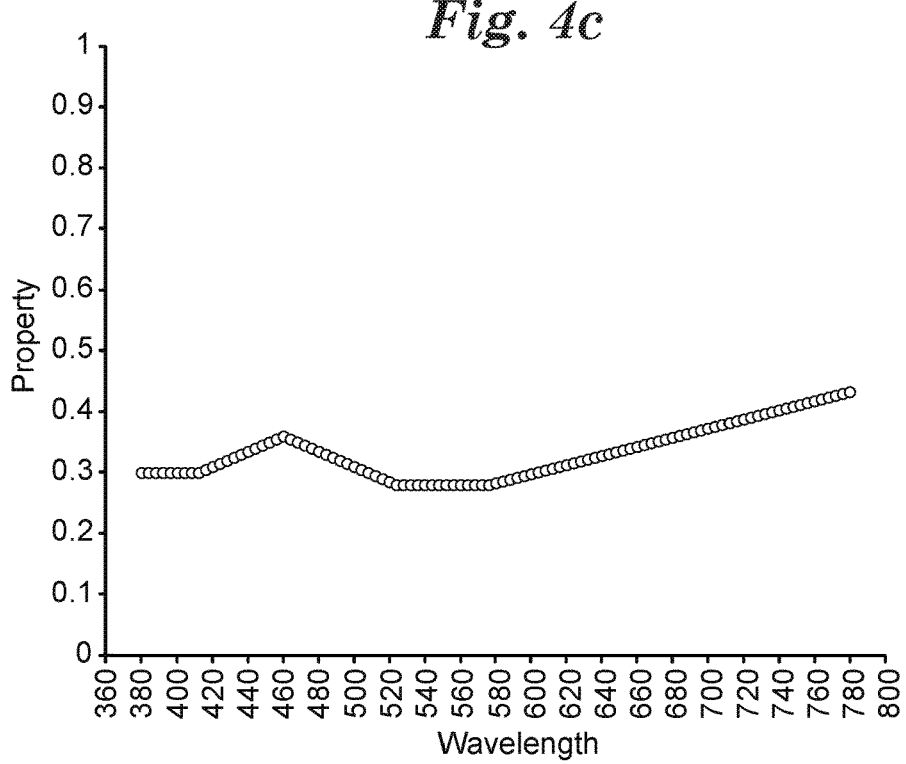
Figure 4E:
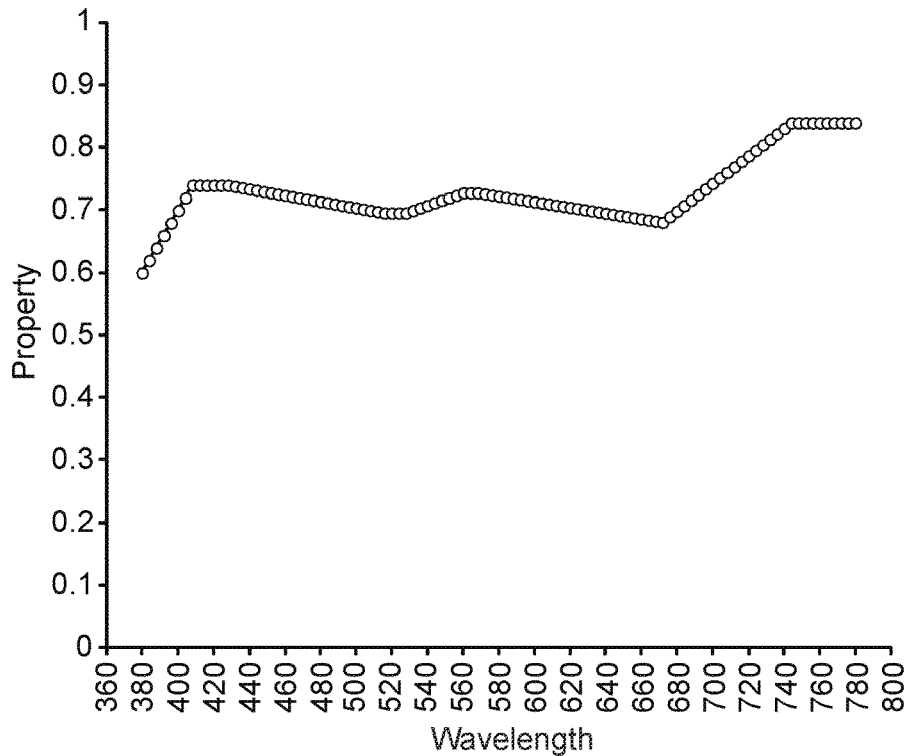

FIG. 3 shows the broadly accepted RGB Color Matching Functions (CIE 1931) for the human eye response to light in the visible wavelength range. Generally speaking, it segregates the visible wavelength region into specific wavelength areas, corresponding to human perception of colors blue, green and red. For convenience of defining a sloped spectral characteristic, we will use the full-width at half-height wavelength ranges for the RGB Color Matching Functions, corresponding to the blue, green and red portions of the visible wavelength range. These are 420 nm to 475 nm for blue, 505 nm to 610 nm for green, and 555 nm to 635 nm for red. Analysis of the average within each wavelength range (i.e., bin) of a given spectral property (transmission, reflection, etc.), referred to as the bin average, provides a characterization of spectral slope.

Referring to FIGS. 4a through 4e, we now illustrate a definition of spectral slope (or lack of slope) by comparing the relative bin values from each of the three visible wavelength bins. The bin values in this case are the averages of the transmission values for each wavelength range. We define the range among bins as the difference between the maximum bin value divided by the 3-bin average, and the minimum bin value divided by the 3-bin average. If the range among bin values exceeds 15%, then the spectrum is considered sloped, with its color characteristic given by the color of the bin that has the maximum value of bin value divided by the 3-bin average. If the range among bins is less than 15%, then the spectrum is considered constant (un-sloped) with a color characteristic of neutral.

Table I illustrates this quantitative definition for the spectra shown in FIGS. 4a through 4e.

TABLE I

| | Sloped or constant | Bin values | Color characteristic | Range among bin values |
|---|---|---|---|---|
| 4a | Sloped | Blue: 0.77<br>Green: 0.55<br>Red: 0.45 | Blue-sloped | 54% |
| 4b | Sloped | Blue: 0.34<br>Green: 0.39<br>Red: 0.28 | green-sloped | 33% |
| 4c | Sloped | Blue: 0.34<br>Green: 0.48<br>Red: 0.54 | red-sloped | 43% |
| 4d | Sloped | Blue: 0.34<br>Green: 0.29<br>Red: 0.30 | blue-sloped | 16% |
| 4e | Constant | Blue: 0.73<br>Green: 0.71<br>Red: 0.72 | neutral | 3% |

Sloped transmission spectra with an appropriate slope and color characteristic can significantly increase the level of collimation (i.e., increased visible reflection at a specific visible wavelength range, with increasing incidence angle) over that generated with a neutral (unsloped) multilayer construction, even where the coextruded polymer microlayers have been oriented under suitable conditions to produce desired refractive index relationships and desired reflectivity characteristics.

In addition, it is understood that spectral reflection bands from multilayer interference reflectors move to shorter wavelengths with increasing incidence angle.

Figure 5:
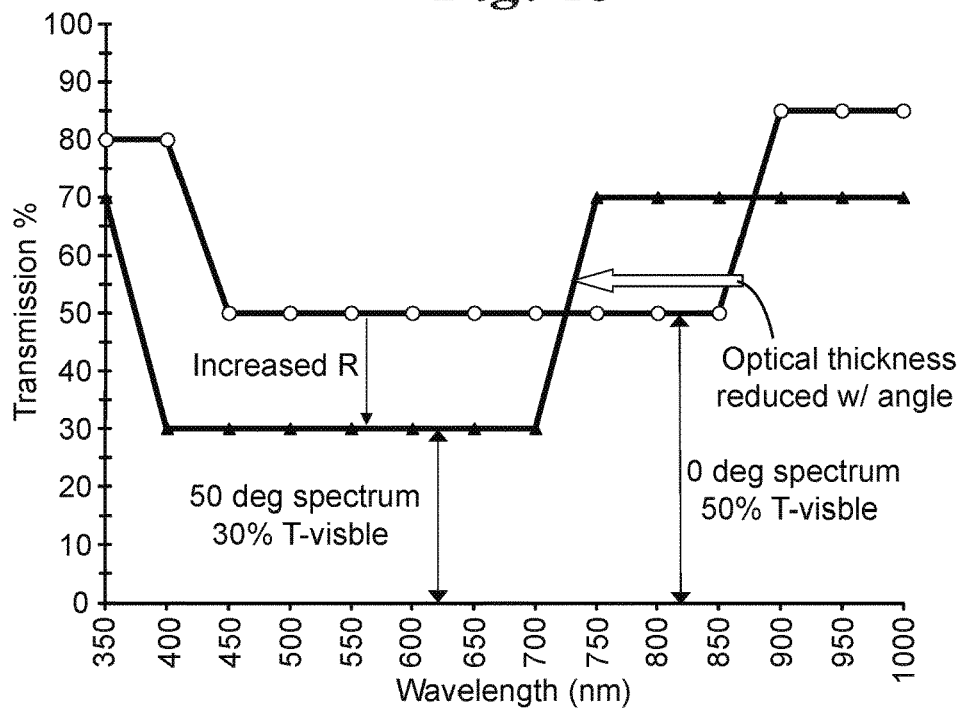
FIG. 5 is a graph illustrating the effects of a polymeric multilayer optical film having increasing reflectivity with angle, due to its constituents' refractive index relationships.
Figure 6:
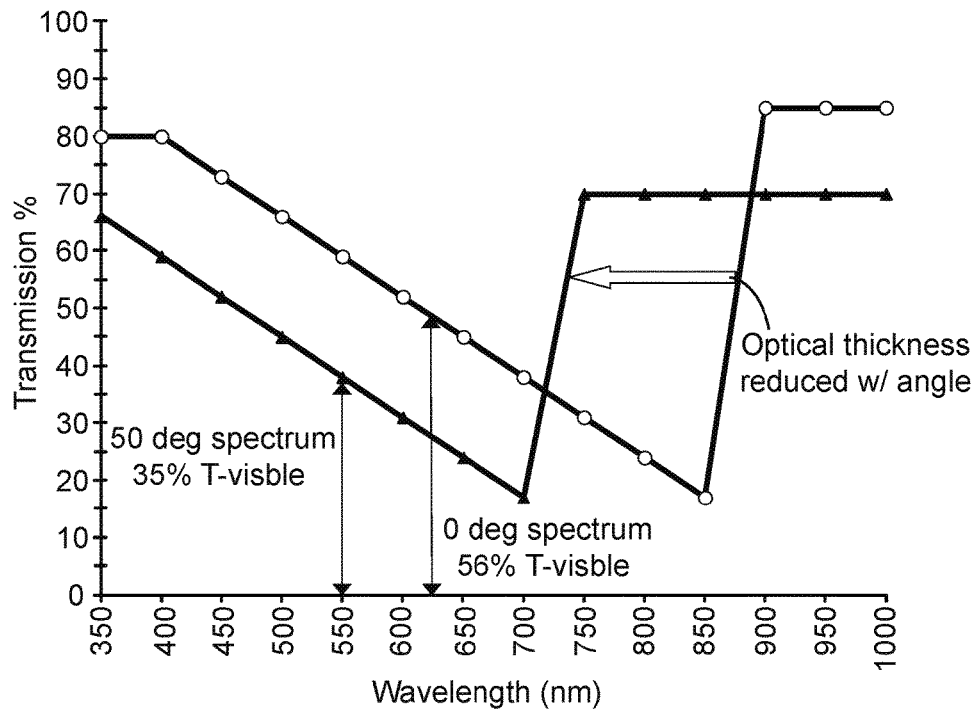
FIG. 6 is a graph illustrating the effects of a polymeric multilayer optical film having a sloped transmission spectra that moves to shorter wavelengths with increasing incidence angle.
Figure 7:
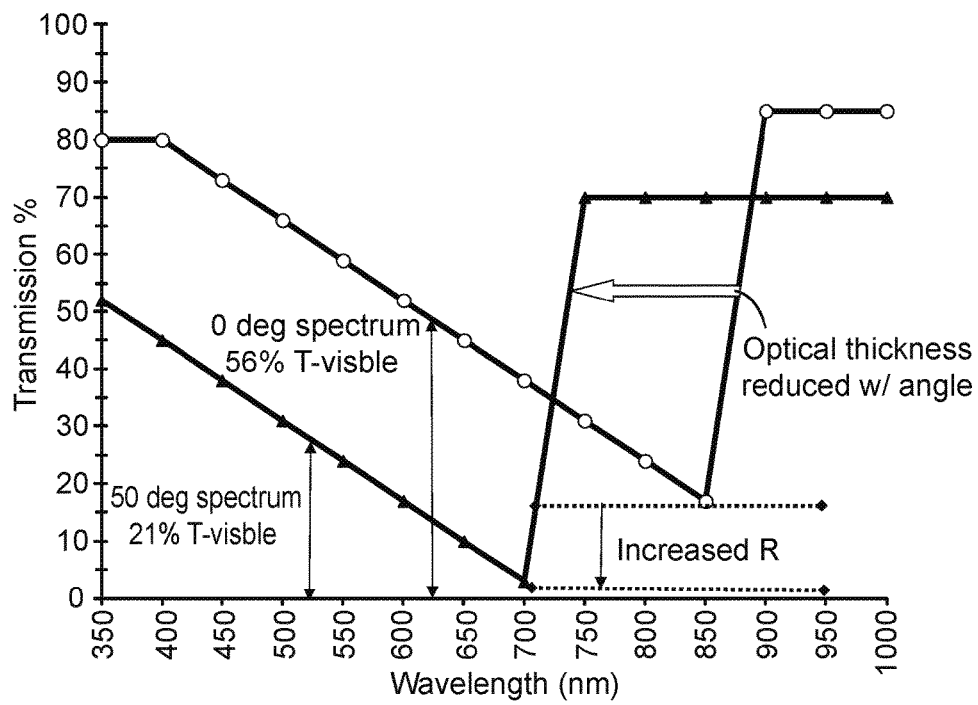
FIG. 7 is a graph illustrating the combined effects of a polymeric multilayer optical film having both increasing reflectivity with angle, due to its constituents' refractive index relationships, and a sloped transmission spectra that moves to shorter wavelengths with increasing incidence angle.

FIGS. 5, 6 and 7 illustrate the combined effects of a polymeric multilayer optical film having both increasing reflectivity with angle, due to its constituents' refractive index relationships, and a sloped transmission spectra that moves to shorter wavelengths with increasing incidence angle. Note that the values of reflectivity in these figures are only illustrative, and that low loss polymers allow one to assume that T %=100%−R %. Spectra of achievable film designs are presented herein. In each of FIGS. 5, 6 and 7, the transmission spectrum can be either for light polarized along a preferred axis, or for unpolarized light.

FIG. 5 is a block diagram representation of a transmission spectrum at two angles of incidence. This representation illustrates an instance where the coextruded polymer microlayers have been oriented under suitable conditions to produce refractive index relationships where no Brewster angle exists for p-polarized light, and thus the reflectivity of the p-polarized light increases significantly with incidence angle. Or it may represent the more general case of s-polarized light reflectivity increase with increasing incidence angle.

Note in FIG. 5 that blue-shift in optical thickness (wavelength location of reflection band) of the spectrum with the change in angle, has no effect on the degree of collimation because the lateral shift of this broadband spectrum has no effect on the transmission of visible light (visible light can be defined as approx 400 to 700 nm, or 420 to 680 nm, or 430 to 650 nm depending on the system requirements). Only the increase in visible light reflectivity contributes to the collimation process.

Now consider the schematic sloped (blue-sloped) spectra for p-polarized light shown in FIG. 6 for a polymeric multilayer optical film that has the z-indices matched for alternating polymer layers. Firstly, recall that a multilayer interference reflector having matched z-indices has substantially no increase or decrease in reflectivity for p-polarized light, as angle of incidence increases, although the band will shift to shorter wavelengths like any other multilayer interference reflector. The bandwidth is sufficiently wide so the long-wave bandedge is beyond the edge of the visible spectrum for all angles of incidence of interest. Although the magnitude of the reflectivity does not change with angle of incidence for p-polarized light, the blue slope of the spectrum will cause the visible-average transmission of the spectrum in FIG. 6 to decrease as the angle of incidence increases. Stated another way, the lateral shift of the blue-sloped spectrum causes the reflectivity of a specific wavelength to increase with angle, even though the spectral curve is not shifted in the vertical direction. For this reason, such a film can act to collimate light from a recycling backlight. If the spectra of FIG. 6 were constant (unsloped), there would be substantially no collimation.

Finally, consider the sloped spectra shown in FIG. 7 for a polymeric multilayer optical film that is designed and processed so as to produce refractive index relationships where reflectivity increases for either s-polarized light or p-polarized light, or both, as a function of angle of incidence. It can be seen from the FIG. 7 that collimation now results from both the angle shift of the spectrum as well as the increased reflectivity of the film with angle of incidence.

The magnified collimation effect illustrated in FIG. 7 for a blue-sloped spectrum was never considered to be a useful mechanism for a broadband front reflector overlaying a recycling backlight intended to emit white visible light because of the large difference in transmission for blue light vs. red light (or shortwave vs. longwave light in general). However, with a suitable recycling backlight, we have found that there can be a controlled change in color of the light emitted by the system, ranging across color space from blue, to green, to yellow, to red, or no change giving neutral white, depending on the relationship among the backlight's optical characteristics.

The current disclosure teaches that a front reflector with a blue-sloped transmission spectrum can provide enhanced collimation of red, green and blue light when used as the front reflector of a broadband recycling backlight. The blue-sloped reflector can be a mirror, or it can be an asymmetric reflector with higher transmission for light polarized on one axis compared to the other axis. The sloped spectrum can be for light polarized parallel to either axis, or for unpolarized transmitted light. For unpolarized output, the useful light is the total transmission of the film that has a blue-sloped spectrum. For LCD displays, or any lighting system that needs a substantially polarized output, the highest efficiency is attained when the pass-axis light of the film is transmitted and has a blue-sloped spectrum. Whether the transmission refers to the total light transmission, or to the transmission related to only one axis, the slope can be one where the range among bin values is 15% or as high as 30% or 100% or from 15% to 100% or from 15% to 50%. The blue slope transmission spectrum can be at normal incidence, or it can be at oblique transmission angles such as 45 degrees, or 50 or 60 degrees. At oblique angles, the spectrum for p-polarized light, or for s-polarized light, or both, can be blue-sloped. The examples discussed below illustrate how this was reduced to practice and how the film can be optimized to provide for improved collimation.

We have measured $R^b_{hemi}$ for several materials that have current and potential uses as back reflector components. The measurement apparatus employed was custom-built by the Applicants and is straightforward in design and operation. A commercial six inch integrating sphere manufactured by Labsphere (North Sutton, N.H.) and made of SPECTRALON fluoropolymer, with three mutually orthogonal ports, is used to illuminate samples and to determine hemispherical reflectance spectrum, $R_{hemi}(\lambda)$ (as well as normal-angle transmittance $T^{useable}(0 \text{ deg})$) for front reflector and back reflector samples. A stabilized light source illuminates the sphere through one port. A PR-650 SPECTRASCAN colorimeter (Photo Research Inc., Chatworth, Calif.) spectrophotometer is used to measure the sphere internal wall radiance through a second port. The sample is placed on the third port. Calibration of the integrating sphere wall radiance is done by using a known reflectance standard placed on the third port, and sphere-wall radiance is measured with and without the calibration standard. $R_{hemi}$ is measured by placing samples on the third port; sample hemispheric reflectance $R_{hemi}$ is obtained by taking the ratio of the sphere wall radiance with and without the sample and employing a simple integrating sphere brightness-gain algorithm. This measurement of $R_{hemi}$ is germane to recycling backlight cavity performance in that it is a characterization of the all-angle input, ratioed to the all-angle output reflection, measured in a way much like that which occurs in an actual recycling cavity, and has been used to characterize both back reflector and front reflector materials.

In many embodiments the back reflectors in a recycling cavity have a high hemispherical reflectivity for visible light ($R^b_{hemi}$), that can be significantly higher than the front reflector since the front reflector ($R^f_{hemi}$) is deliberately designed to be partially transmissive to provide the required light output of the backlight.

Using the above described technique, $R^b_{hemi}$ was determined for the following materials in Table II:

TABLE II

| Ref letter | Material | Reflection characteristic | $R^b_{hemi\ visible\ average}$ |
|---|---|---|---|
| A | 3M ESR | Specular | 99.4% |
| B | MC-PET | Near-Lambertian diffuse | 98.4% |
| C | White PET | Near-Lambertian diffuse | 97.5% |
| D | 3M BGD ESR | Semi-specular | 98.0% |

ESR is Vikuiti™ Enhanced Specular Reflector multilayer polymeric film available from 3M Company (St. Paul, Minn.). ESR had a hemispherical reflectivity of 99.4%.

Figure 8:
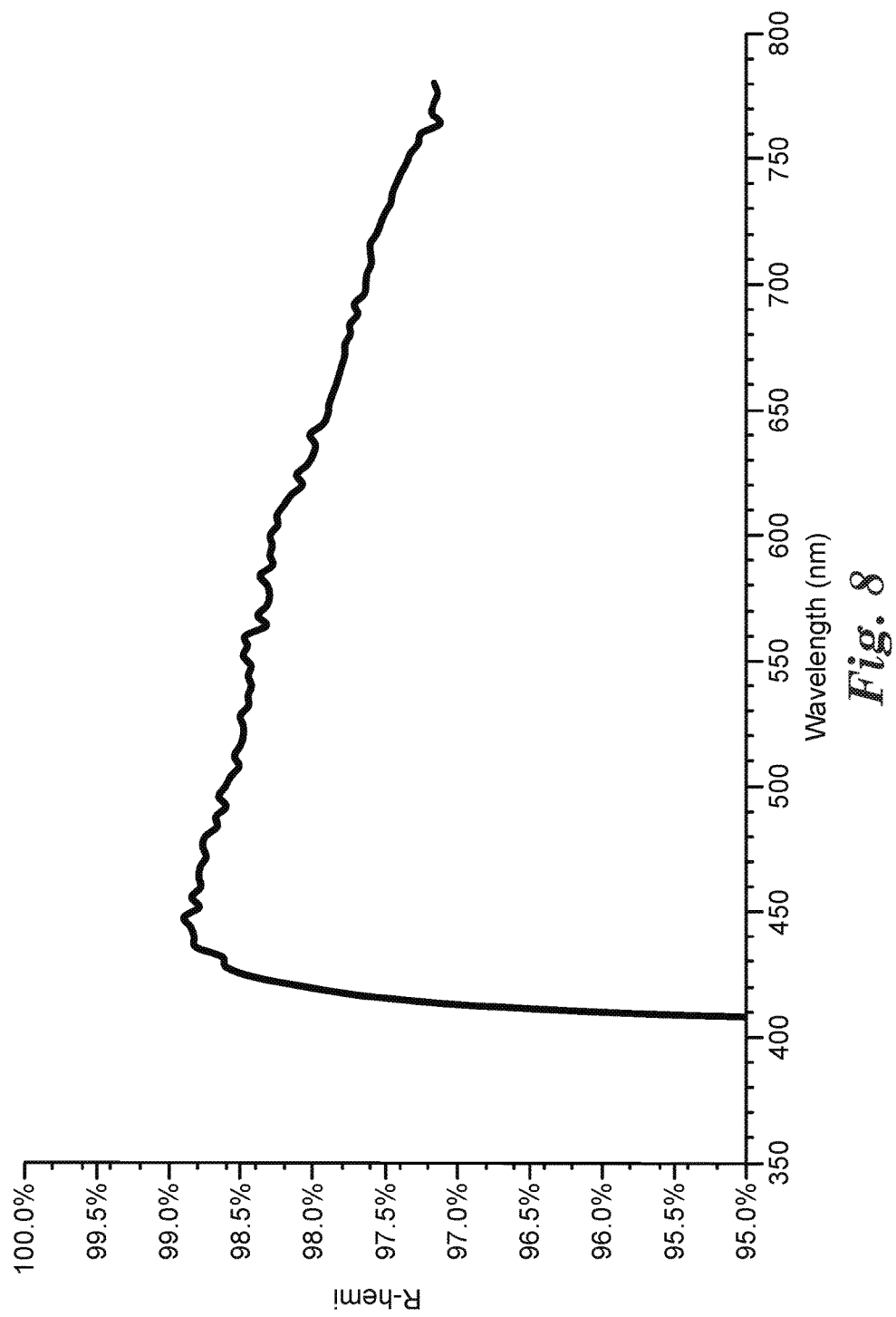
FIG. 8 is a graph of the spectra resulting from the measured hemispherical reflectively spectrum for an MC-PET back reflector film.

MC-PET is a microcellular PET reflective sheeting, available from Furukawa America, Inc. (Peachtree City, Ga.). MC-PET is diffusely reflective. FIG. 8 shows the measured hemispherical reflectively spectrum for an MC-PET back reflector film.

White PET is REFLEXITE Reflector Film RRF-1133, a filled polyester film, available from Reflexite Corp. Avon, Conn.). It is diffusively reflective.

3M BGD ESR is an optical film that includes a plurality of optical elements coated onto an ESR film, as described, e.g., in U.S. Patent Publication No. 2010-0156953.

Reflective (but partially transmissive) components other than, or in combination with, the specific ABPR multilayer reflective films can also be used to form the front reflector for a recycling backlight. Table III includes a non-limiting list of alternative materials.

TABLE III

| REFLECTOR TYPE | CONSTRUCTION | POLARIZATION |
|---|---|---|
| Multilayer | ¼ wave birefringent films, asymmetric orientation | Polarizing |
| | ¼ wave birefringent films, symmetric orientation | Non-polarizing @ 0 degrees |
| | Pile of plates birefringent films, asymmetric orientation | Polarizing |
| | ¼ wave isotropic films | Non-polarizing @ 0 degrees |
| | Pile of plates films, isotropic | Non-polarizing |
| | Perforated mirrors | Non-polarizing |
| | Locally thinned partial reflectors (light transmission is increased in the thinned region) | Polarizing or non-polarizing |
| | Crossed Reflective Polarizers (angle of crossing controls amount of transmitted light) | Polarizing |
| Metal | Thin film enhanced metal films | Non-polarizing |
| | Thin film enhanced metal films, perforated | Non-polarizing |
| | Wire grid | Polarizing |
| Diffusive | Inorganic filled polymer films | Non-polarizing |
| | Voided polymer films | Non-polarizing |
| | ULI diffuser* | Non-polarizing |
| | Polymer blends | Non-polarizing |
| | Polymer blends | Polarizing |
| | Asymmetric DRPF Mirrors | Non-polarizing |
| | Asymmetric DRPF Polarizers | Polarizing |
| | Birefringent fibers-concentric | Polarizing |
| | Islands-in-sea birefringent fibers | Polarizing |
| | Holographic Diffusers | Non-polarizing |
| Microstructured | Lenticular structures or linear prisms | Non-polarizing |
| | 2D structured surfaces (cube corner, lenslet arrays, beaded gain diffuser BGD) | Non-polarizing |
| Cholesteric (with retarder films) | Lefthand | Polarizing |
| | Righthand | Polarizing |
| | Combinations of both | Polarizing - adjustable |
| Metal/Dielectric | Metal/dielectric layered mirrors | Non-polarizing |

*ULI diffuser is a diffuse coating, described in PCT Publication No. WO2010/120971.

Some of these additional films, when combined with an ABPR multilayer reflective film, can produce a reflection characteristic that can be diffusive, semi-specular, or specular.

Figure 9:
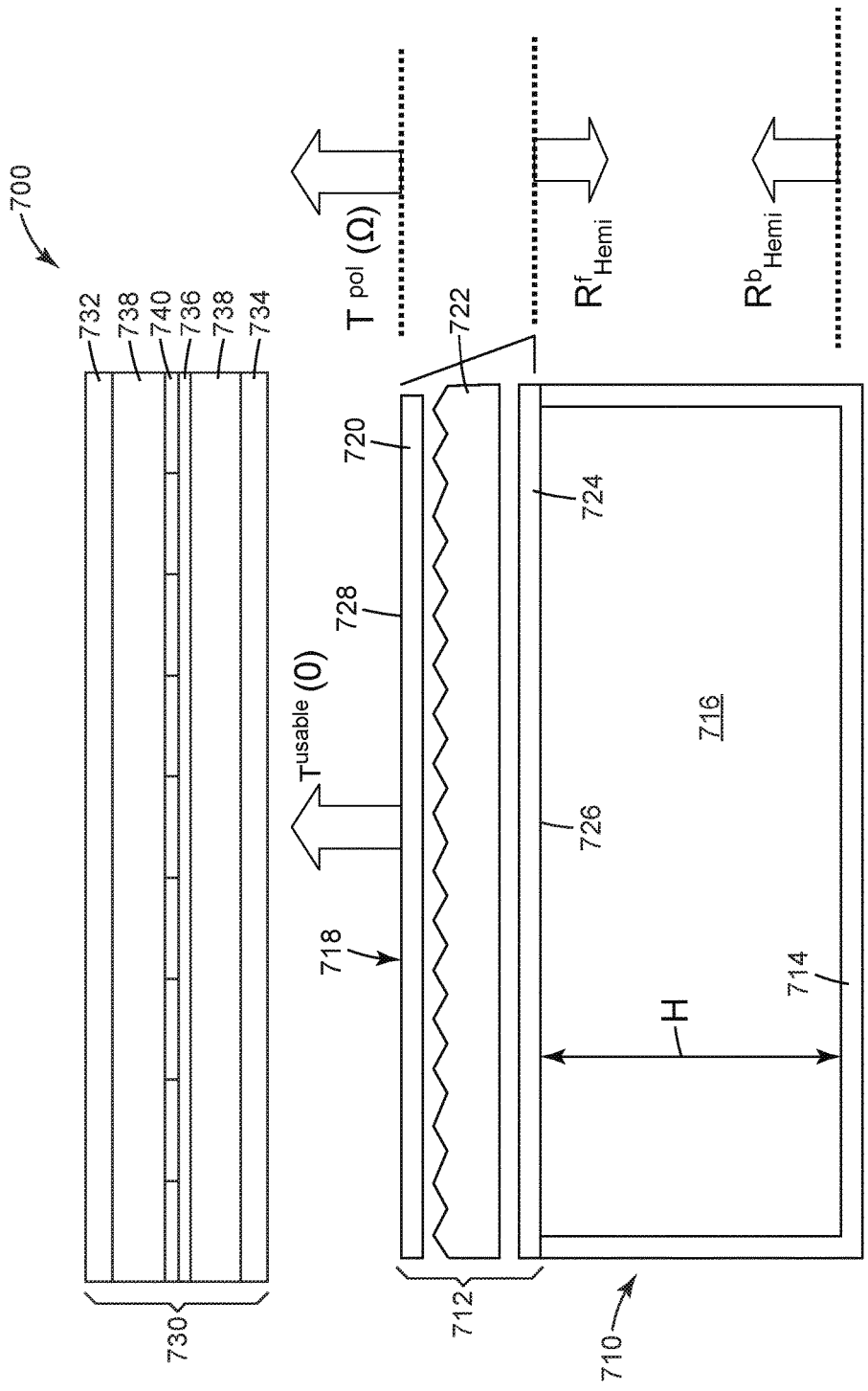
FIG. 9 is a schematic cross-section view of a display system.

For illustrative purposes, it is convenient to further define the optical surfaces of the backlight front reflector and back reflector, which form the recycling cavity. FIG. 9 is a schematic cross-section view of a display system 700 that includes a backlight 710 and an LC panel 730. The backlight 710 is positioned to provide light to the LC panel 730. The backlight 710 includes a front reflector 712 and a back reflector 714 that form a light recycling cavity 716 having a cavity depth H and an output region 718 of area Aout. The front reflector 712 includes first, second, and third front reflector films 720, 722, 724, that form the front reflector film stack. Any suitable films described herein can be utilized to provide the front reflector 712.

The LC panel 730 typically includes a layer of LC 736 disposed between panel plates 738. The plates 738 are often formed of glass and may include electrode structures and alignment layers on their inner surfaces for controlling the orientation of the liquid crystals in the LC layer 736. These electrode structures are commonly arranged so as to define LC panel pixels, i.e., areas of the LC layer where the orientation of the liquid crystals can be controlled independently of adjacent areas. A color filter 740 may also be included with one or more of the plates 738 for imposing color on the image displayed by the LC panel 730.

The LC panel 730 is positioned between an upper absorbing polarizer 732 and a lower absorbing polarizer 734. In the illustrated embodiment, the upper and lower absorbing polarizers 732, 734 are located outside the LC panel 730. The absorbing polarizers 732, 734 and the LC panel 730 in combination control the transmission of light from a backlight 710 through the display system 700 to the viewer. For example, the absorbing polarizers 732, 734 may be arranged with their transmission axes perpendicular to each other. In an unactivated state, a pixel of the LC layer 736 may not change the polarization of light passing therethrough. Accordingly, light that passes through the lower absorbing polarizer 734 is absorbed by the upper absorbing polarizer 732. When the pixel is activated, the polarization of the light passing therethrough is rotated so that at least some of the light that is transmitted through the lower absorbing polarizer 734 is also transmitted through the upper absorbing polarizer 732. Selective activation of the different pixels of the LC layer 736, for example, by a controller (not shown), results in the light passing out of the display system 700 at certain desired locations, thus forming an image seen by the viewer. The controller may include, for example, a computer or a television controller that receives and displays television images.

One or more optional layers (not shown) may be provided proximate the upper absorbing polarizer 732, for example, to provide mechanical and/or environmental protection to the display surface. In one exemplary embodiment, the layer may include a hardcoat over the upper absorbing polarizer 732.

It will be appreciated that some types of LC displays may operate in a manner different from that described above. For example, the absorbing polarizers 732, 734 may be aligned parallel and the LC panel may rotate the polarization of the light when in an unactivated state. Regardless, the basic structure of such displays remains similar to that described above.

In some embodiments of the present invention, an ABPR multilayer reflective film with a sloped transmission spectrum, may be combined (optically coupled) with some form of the lower absorbing polarizer 732, forming a recycling backlight front reflector 712 combined with the LCD lower absorbing polarizer. In this instance, the absorbing polarizer film(s) or coating(s) must be disposed on the upper side of the recycling backlight front reflector, so as to maintain a high value of $R^f_{hemi}$. In this embodiment, the recycling backlight 710, front reflector 712, and the LC panel 730, may be combined into a single element of a display system.

For analysis purposes in which we consider the front and back reflector to be of substantially infinite extent, we can define a back reflector effective reflectivity for visible unpolarized light, $R^b_{hemi}$(effective), as including all of the reflective and loss elements within the interior of the recycling cavity other than the aperture defining the output surface. In this regard, loss elements such as LED dies, lenses, packaging, circuitry, and exposed circuit board, are included in an area-fraction sense, with the surrounding high-reflectivity materials, to determine $R^b_{hemi}$(effective). Further, physical gaps between reflective surfaces are also included in defining this effective reflectivity. The physical location of this $R^b_{hemi}$(effective) surface can then be conveniently drawn as coincident with the mean surface of the physical cavity interior. Often, for well constructed recycling cavity backlights, the reduction of $R^b_{hemi}$(effective), from the measured value(s) of $R^b_{hemi}$ for the back reflector material, is a few percent or less and will therefore be ignored here.

Further, it is convenient to define the optical properties of the front reflector using the simple constructs $R^f_{hemi}$, and $T^{pol}(\Omega)$, where "pol" (sometimes illustrated with the symbol "∥") refers to the polarization state that is aligned with the pass-axis of the bottom absorbing polarizer 734 of an application LCD panel 730 the (shown above the backlight in FIG. 9), and Ω represents the solid angle of interest representing the viewers' geometrical location relative to the backlight output surface. A particular value of Ω, can be represented by a combination of the defined plane of incidence (22 and 24), with the incidence angle θ. It should be understood that $T^{pol}(\Omega)$, can represent either the transmission of the polarized light aligned with the bottom absorbing polarizer 734 of an LCD application, or alternatively, as the transmission of unpolarized, or arbitrarily polarized light for backlight applications that do not have a preferred polarization of input light. Thus, $T^{pol}(\Omega)$ may be replaced with $T(\Omega)$, depending on the application context.

Furthermore, it is convenient to define front reflector and back reflector properties $R^f_{hemi}$, $R^b_{hemi}$ and $T^{pol}(\lambda)$, as either averages across the visible band, or as wavelength specific (λ), spectra properties, in which case they are written as $R^f_{hemi}(\lambda)$, $R^b_{hemi}(\lambda)$ and $T^{pol}(\Omega,\lambda)$, $R^f_{hemi}(\lambda)$ is a measurable quantity, describing the hemispherical reflectivity of the front reflector. This front reflector can be configured to consist of a single reflective film or numerous combinations of reflective films or reflective elements, such as those listed in Table II. They may be laminated or spaced apart, but in general they are defined as components that are coextensive with the output face of the cavity and operate together as a system to recycle light from the sources to thoroughly mix the light within the cavity. The components of the front reflector can include diffusive elements such as diffuser plates, and surface structure diffusers, as well as refractive elements such as lenticular and/or prismatic films.

The value of $T^{pol}(\Omega)$ is defined as a transmission coefficient: the ratio of the transmitted intensity at an angle centered on the viewer angle of interest, Ω, relative to the front reflector plane, with the front reflector and an absorbing polarizer overlaying an all-angle light source (e.g., an angle-mixed recycling cavity), to the intensity at 0 degrees for only the absorbing polarizer overlaying the all-angle light source. For this measurement, the polarization properties of the front reflector are appropriately aligned with the pass axis of the absorbing polarizer. $T^{pol}(\Omega,\lambda)$ spectra have been measured for the examples below using a hemispheric light source (all angle light source), with a detector consisting of a diode array grating spectraphotometer.

In reference to FIG. 9, it is further convenient to define the front reflector 712 as a surface with properties $R^f_{hemi}$, residing at an inner-most surface 726 of the front reflector film, or the inner-most reflective component of the front reflector component stack, and $T^{pol}(\Omega)$, residing at an outer-most surface 728 of the front reflector film, or the outer-most reflective component of the front reflector component stack.

In many cases, it is desirable to combine high-recycling properties of a backlight cavity having a product $R^f_{hemi} * R^b_{hemi}$ of at least 0.65, or at least 0.75, or at least 0.85, with sufficiently high values of $T^{pol}(\Omega)$, as this provides the angle-mixed and spatially mixed light within the cavity, and an "escape mechanism" across the output area, for delivering spatially uniform brightness, into the view-angle of interest, to the application.

For a recycling backlight cavity with a high degree of angular and spatial randomization of light rays within the cavity, the brightness through the output surface into any particular view angle Ω will be substantially equal at various points along the output surface. For such a recycling cavity, the brightness into any particular output angle Ω can be approximated by the expression:

$$L(\Omega)=((\text{Light Source Lumens})/(2\pi \times A_{out}))*(T^{pol}(\Omega)/(1-R^f_{hemi}\times R^b_{hemi})).$$

The "Light Source Lumens" is that which is emitted into the cavity by the light sources disposed within or optically coupled to the cavity. The expression $T^{pol}(\Omega)/(1-R^f_{hemi}\times R^b_{hemi})$ represents the fractional increase in visible-averaged intensity into a solid angle Ω, of polarization "pol," for the recycling cavity with front and back reflectors, compared with an angle-mixed flux into the forwards hemisphere (relative to the output surface) of the light sources alone. The expression $T^{pol}(\Omega,\lambda)/(1-R^f_{hemi}(\lambda)\times R^b_{hemi}(\lambda))$, when determined across a range of wavelengths λ, is the spectra of the fractional increase in backlight intensity due to the presence of the front reflector.

It is known that most LCD panels tend to move the "white point" towards yellow or red, as a function of increasing view angle. This is particularly true for VA and TN liquid crystal varieties in commercialized displays. It would be beneficial for a recycling backlight system for an LCD to be capable of delivering white light to the LCD panel that compensates for the intrinsic LC panel color-change (in the white state) as a function of increasing view angle. For example, an LC display that shifts color from the normal-angle white point with increasing view angle can be color-corrected by combining the LC panel with a recycling backlight system of the present invention.

EXAMPLES

The following examples include various sizes of edge-lit backlight configurations. The tested backlights included different films for both the front and back reflectors as is shown in Table IV herein.

Luminance and colorimetric data for the following examples were measured using an Autronic ConoScope ConoStage 3 (available from Autronic-Melchers GmbH, Karlsruhe, Germany). Color data is expressed in the color coordinates on the CIE 1976 Uniform Chromaticity Scale and herein referred to as x and y.

Measurements were carried out by configuring the backlight recycling cavity with the front reflector films to be tested and then using the colorimetric camera to take conoscopic images of the test system.

Unless otherwise noted, the front transmission spectra and backlight chromaticity were measured through an absorbing polarizer (HLC2-5618S from Sanritz America, Chula Vista, Calif.) laminated to an acrylic plate. The pass axis of the absorbing polarizer was oriented parallel with the pass axis of the front reflector film.

Characterizations were performed using the techniques referenced above on front reflectors, consisting of ABPR film articles as described in the co-filed Application having Ser. No. 61/549,614, in combination with diffusive films. The ABPR includes a multilayer construction (e.g., coextruded polymer microlayers that have been oriented under suitable conditions to produce desired refractive index relationships and desired reflectivity characteristics) having a very high reflectivity for normally incident light in the block polarization state and a lower but still substantial for normally incident light in the pass polarization state. Each of the front reflectors used as a component in the backlight recycling systems of Examples 1 through 4 have various sloped transmission spectra (blue, neutral or red) for the usable polarization.

The visible average results obtained for a first set of characterizations are listed in Table IV:

TABLE IV

| | Front Reflector Configuration | Front Reflector | $R^f_{hemi\ Vis\ avg}$ | $T^{pol}$ (0 deg) Vis avg |
|---|---|---|---|---|
| Example 1 | ULI Diffuser + ABPR 8-22-A | 1 side diffuse | 79.7% | 53.1% |
| Example 2 | ULI Diffuser + ABPR 8-22-C + BGD | 2 side diffuse | 79.0% | 44.6% |
| Example 3 | ULI Diffuser + ABPR 8-22-F + BGD | 2 side diffuse | 71.7% | 58.5% |
| Example 4 | ULI Diffuser + ABPR 159-022/APF + BGD | 2 side diffuse | 84.3% | 40.7% |

Example 1

Gold-822A as Front Reflector on an Edge-Lit, Ink-Dot Extractor Light Guide Backlight This apodized broadband partial reflector (ABPR) with differing optical packets (see Ser. No. 61/549,614) of Example 1, was manufactured using the feedblock method described in U.S. Patent Application 61/332,401 entitled "Feedblock for Manufacturing Multilayer Polymeric Films", filed May 7, 2010. Two packets of 275 layers each of alternating low and high index polymer layers were coextruded as a cast web and then stretched in a tenter on a continuous film making line. The high index material was a 90/10 coPEN (90% naphthalate units and 10% terephthalate units). The low index material was differed between packet 1 and for packet 2 of the microlayers. The low index material for packet 1 was a blend of PETg (EASTAR GN071 copolyester from Eastman Chemical, Kingsport, Tenn.) and an amorphous 55/45 coPEN (55% naphthalate units and 45% terephthalate units). These coPENs are described in U.S. Pat. No. 6,352,761. The blend ratio was adjusted so as to obtain an index of 1.605. The low index material for packet 2 was NEOSTAR FN007 copolyester ether elastomer from Eastman Chemical, Kingsport, Tenn., and had a measured index of 1.505. All indices were measured at 633 nm.

The 275 alternating microlayers in each packet were arranged in a sequence of ¼ wave layer pairs, where the thickness gradient of the layers was designed to provide a strong reflection resonance broadly and uniformly across bandwidth from approximately 400 nm to 900 nm wavelength for one polarization axis, and a weaker reflection resonance for the orthogonal axis, with a smooth and blue-sloped transmission spectra. Five micron thick skin layers of PETg were disposed on the outside surfaces of the coherent alternating microlayer stack. The overall thickness of the film, including the alternating microlayers, the PBLs and the skin layers, was approximately 75 μm. This film was manufactured using the techniques described herein.

The birefringent refractive index values (measured at 633 nm) for the 90/10 coPEN layers were nx1=1.807, ny1=1.623, nz1=1.497. These refractive index values, with associated low index optical material refractive index values, make Gold-822A strongly reflective for light in the block polarization state, and partially reflective for light in the pass polarization state. Refer to FIG. 2 for polarization direction details.

Figure 10A:
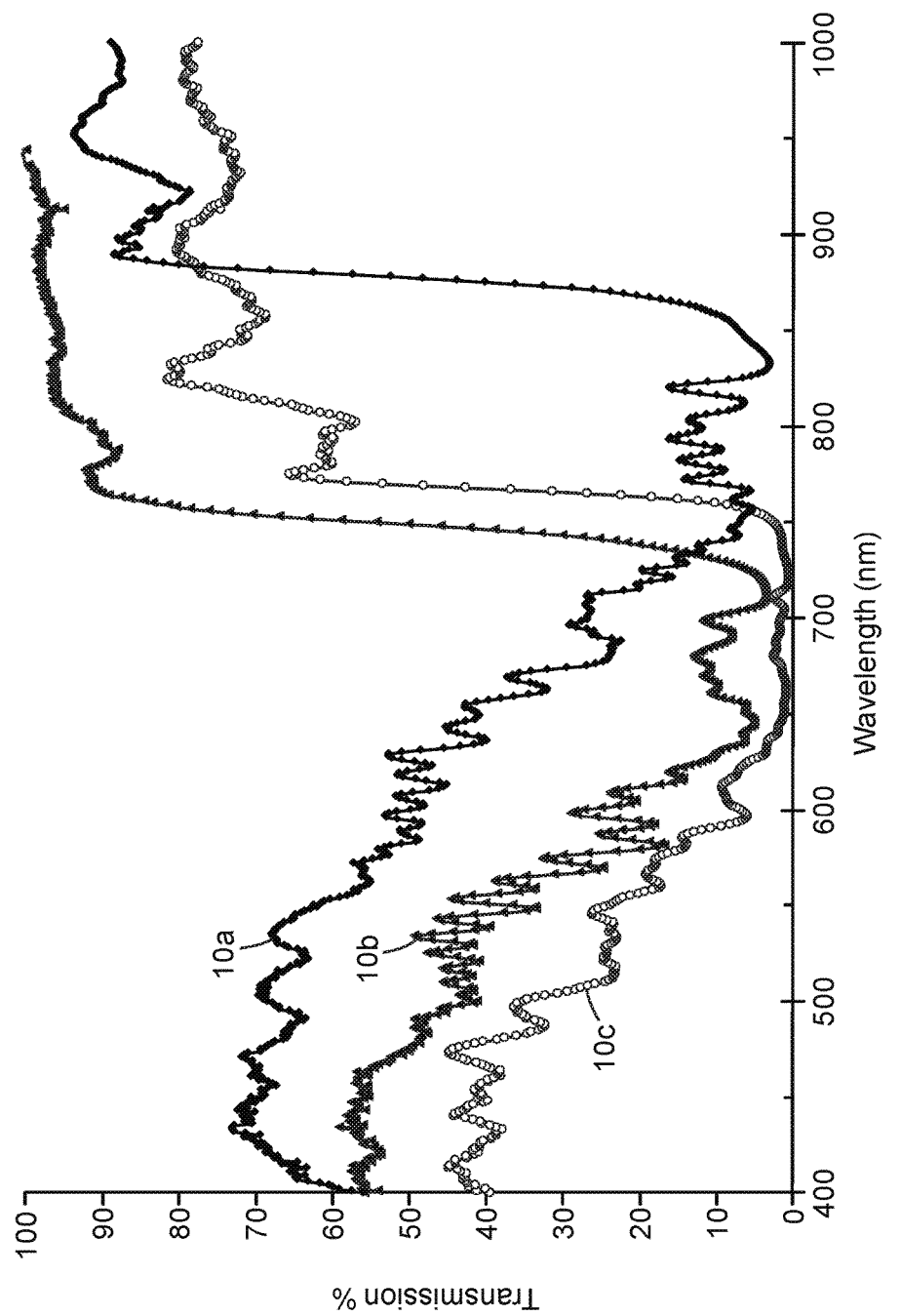
FIGS. 10a and 10b are graphs of the measured pass state transmission spectra for Gold-822A in two configurations for Example 1.
Figure 10B:
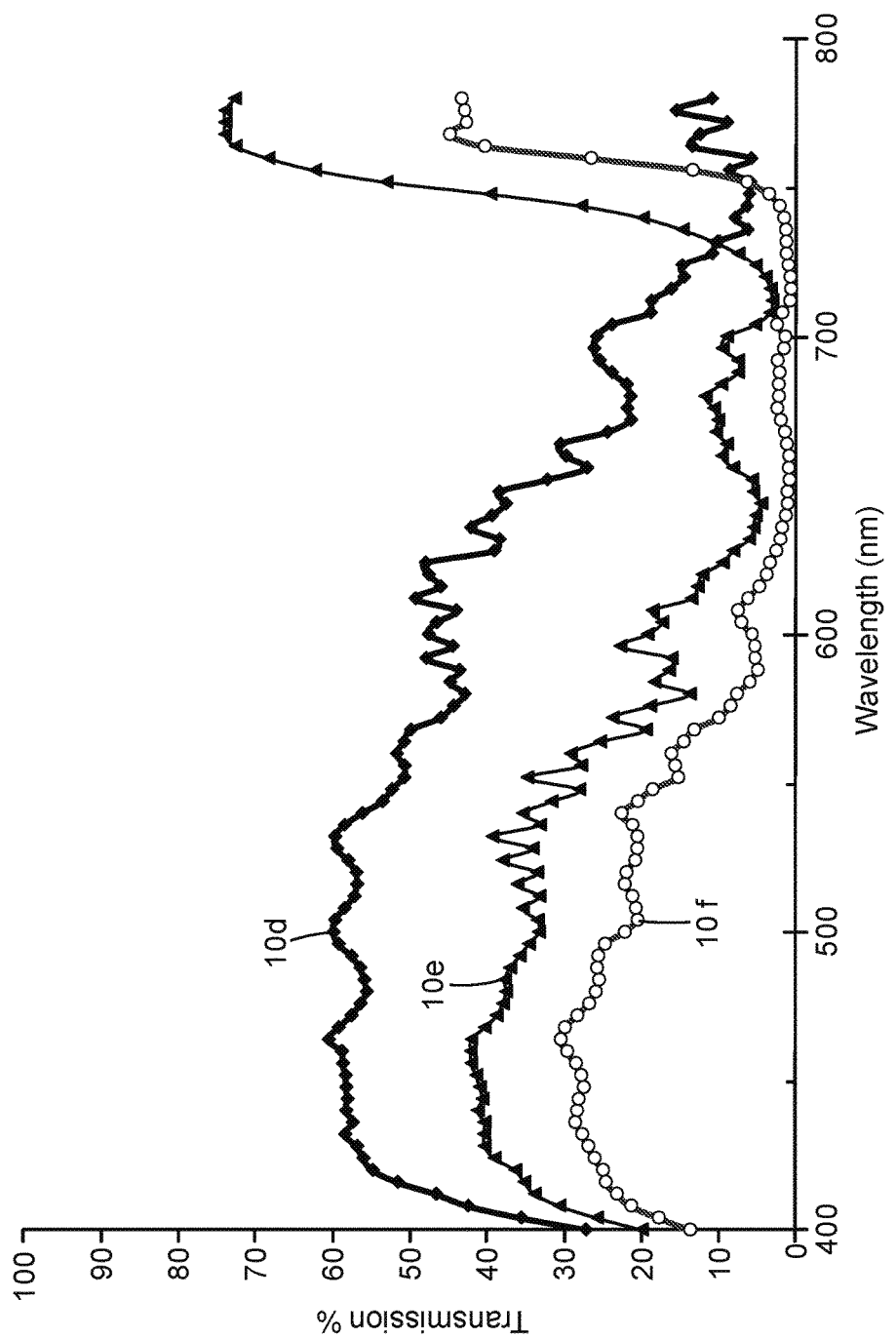

FIG. 10a shows the measured pass state transmission spectra for Gold-822A in two configurations. Transmission spectra were measured for sample Gold 822A with no other films attached, for normal incidence pass state light (0) (Curve 10a) and for 50 degree angle incidence, for p-polarized pass state light (Curve 10b) and s-polarized pass state light (Curve 10c). Another set of transmission measurements are shown in FIG. 10b, for a sample consisting of a ULI diffuser (see Table II) attached to the Gold-822A film, with the diffuser facing the light source. Normal incidence pass state light transmission for this 1-sided diffusive ABPR is shown (Curve 10d), and for 50 degree angle incidence, for p-polarized pass state light (Curve 10e) and s-polarized pass state light (Curve 10f).

The spectral slope (or lack of slope) was analyzed by comparing the relative average values from each of the three visible wavelength bands, in the blue, the green and the red. Table V shows the result of this characterization.

TABLE V

| | Sloped or constant | Color characteristic | Range among bin-averages |
|---|---|---|---|
| 0 Pass Gold-822A | Sloped | Blue | 23% |
| 50P Pass Gold-822A | Sloped | Blue | 79% |
| 50S Pass Gold-822A | Sloped | Blue | 120% |
| 0 Pass ULI diffuser + Gold-822A | Sloped | Blue | 31% |
| 50P Pass ULI diffuser + Gold-822A | Sloped | Blue | 88% |
| 50S Pass ULI diffuser + Gold-822A | Sloped | Blue | 124% |

In this example, we used a commercially available LCD backlight with a series of "cool white" LEDs coupled into the edge of a standard light-guide plate configured with a scattering ink-dot extraction pattern. The light-guide plate is a white back reflector with a measured $R^b_{hemi}$ spectrum given in FIG. 8.

Using the backlight analysis discussed above, we can now calculate the backlight intensity spectra, using the measured spectra of $R^b_{hemi}(\lambda)$, $R^f_{hemi}(\lambda)$, and $T^{pol}(\Omega,\lambda)$. We then analyze the backlight intensity spectra in order to determine color outcome for this backlight, overlaid with the front reflector of Example 1.

Figure 11:
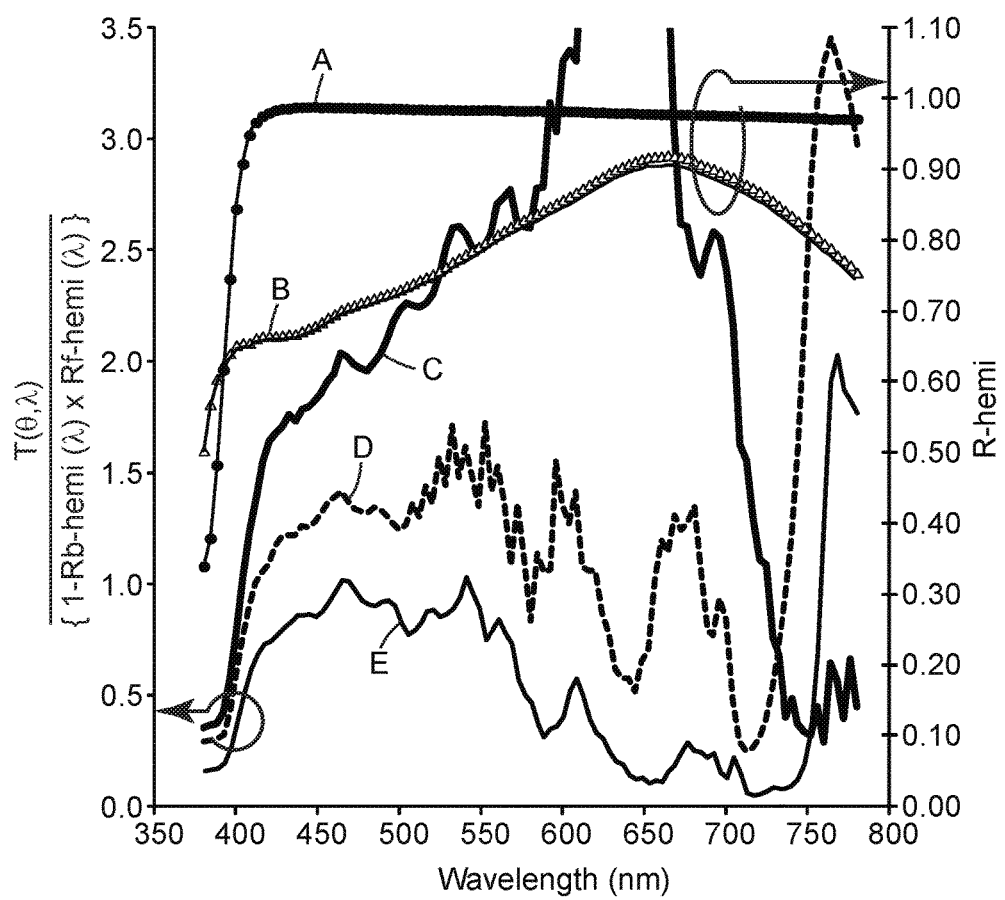
FIG. 11 is a graph of the measured spectra of $R^b_{hemi}(\lambda)$ for the backlight, and of the example front reflector $R^f_{hemi}(\lambda)$, of Example 1, and of the calculated backlight intensity spectra.

FIG. 11 shows the measured spectra of $R^b_{hemi}(\lambda)$ (curve A) for the backlight, and of the example front reflector $R^f_{hemi}(\lambda)$ (curve B), where the front reflector is the ABPR Gold-822A with attached ULI diffuser facing the light source. Note that the spectrum for $R^f_{hemi}(\lambda)$ is strongly sloped to the red side of the visible wavelength region. Also plotted are backlight intensity spectra, calculated for the view angles 0 degrees (curve C), 50 degrees for P-polarized light along plane 24 of FIG. 2 (curve D), and 50 degrees for S-polarized light perpendicular to plane 22 of see FIG. 2.

We analyzed the spectral slope of the backlight intensity spectra by comparing the relative average values from each of the three visible wavelength bands, in the blue, the green and the red. Table VI shows the result of this characterization.

TABLE VI

| | Sloped or constant | Color characteristic | Range among bin averages |
|---|---|---|---|
| Backlight Intensity 0 Pass | Sloped | Red | 44% |
| Backlight Intensity 50P Pass | Sloped | Blue | 21% |
| Backlight Intensity 50S Pass | Sloped | Blue | 67% |

A comparison of the results in Tables V and VI revealed a surprising indication that despite the strong blue-sloped transmission spectra for the front reflector at 0 degrees (normal view angle), the resultant recycling backlight intensity spectrum was calculated as being strongly red-sloped. The 50 degree view-angle backlight intensity spectra, along the orthogonal planes 24 and 22, is predicted to have a blue-sloped characteristic, corresponding to the front reflector transmission spectra slope characteristic at these view angles.

Figure 12A:
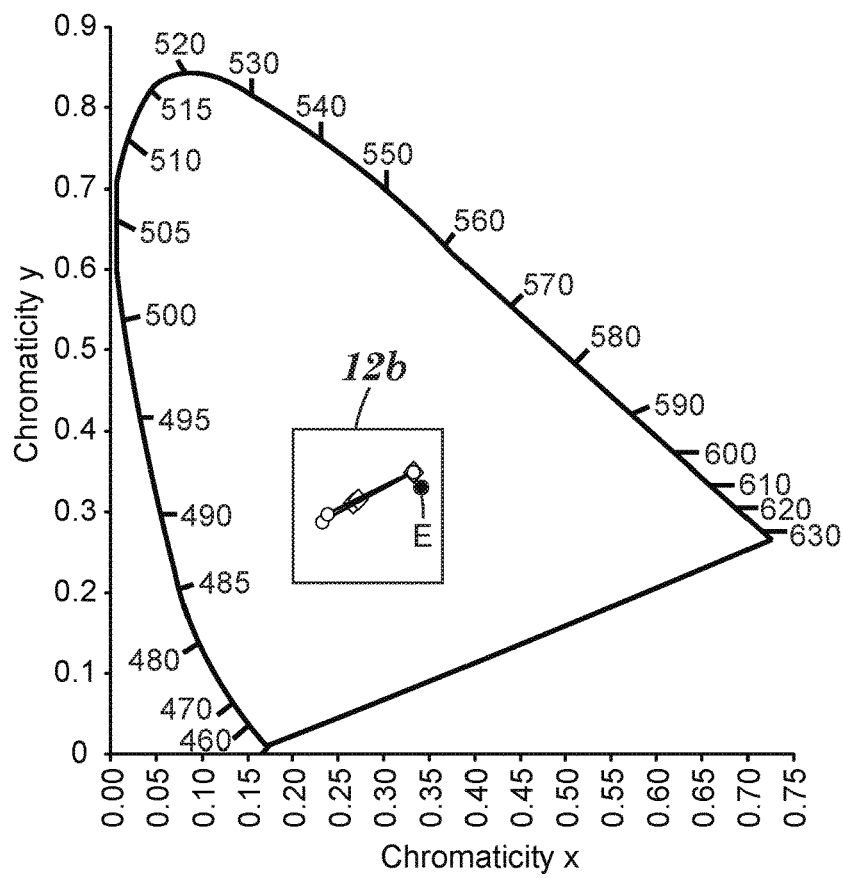
FIG. 12a is a graph of the chromaticity data for backlight emission of Example 1.
Figure 12B:
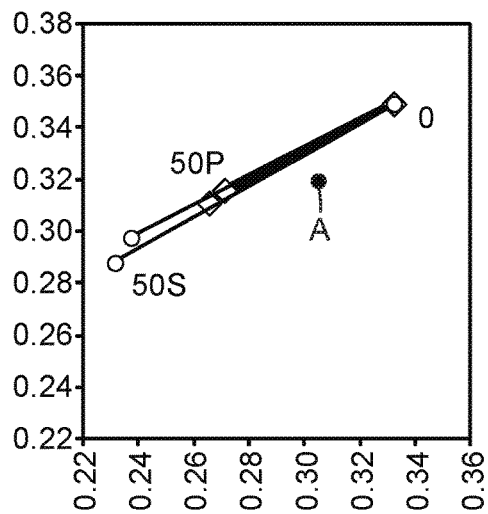

Finally, the backlight of Example 1, with front reflector Gold-822A with ULI-diffuser, was measured for spatial-average backlight emitted color, at the 0 degree at the positive and negative 50 degree view angles, for each of the p-polarized and s-polarized pass axes (labeled 50S and 50P). The chromaticity data for backlight emission is shown in FIG. 12a and FIG. 12b.

The measurements of color emitted from the recycling backlight showed reddening at the normal (0 degree) view and strong bluing for each of the 50 degree view angles (s-polarization and p-polarization). In addition to measured color coordinates of the backlight with the example front reflector, FIG. 12b, shows the color coordinate for the backlight, without the influence of the front reflector (point A).

Example 2

Gold-822C as Front Reflector on an Edge-Lit, Ink-Dot Extractor Light Guide Backlight The apodized broadband partial reflectors (ABPR) with differing optical packets (as described in Ser. No. 61/549,614) of Example 2, was manufactured using the feedblock method described in U.S. Patent Application 61/332,401 entitled "Feedblock for Manufacturing Multilayer Polymeric Films", filed May 7, 2010. Two packets of 275 layers each of alternating low and high index polymer layers were coextruded as a cast web and then stretched in a tenter on a continuous film-making line. The high index material was a 90/10 coPEN (90% naphthalate units and 10% terephthalate units). The low index material was differed between packet 1 and for packet 2 of the microlayers. The low index material for packet 1 was PETg (EASTAR GN071 copolyester, Eastman Chemical, Kingsport, Tenn.) with an index of 1.565. The low index material for packet 2 was a co-polyester having a measured index of 1.543. All indices were measured at 633 nm. The 275 alternating microlayers in each packet were arranged in a sequence of ¼ wave layer pairs, where the thickness gradient of the layers was designed to provide a strong reflection resonance broadly and uniformly across bandwidth from approximately 400 nm to 900 nm in wavelength for one polarization axis, and a weaker reflection resonance for the orthogonal axis, with a smooth and blue-sloped transmission spectra. Five micrometer-thick skin layers of PETg were disposed on the outside surfaces of the coherent alternating microlayer stack. The overall thickness of the film, including the alternating microlayers, the PBLs and the skin layers, was approximately 75 µm. This film was manufactured using the techniques described herein.

The birefringent refractive index values (measured at 633 nm) for the 90/10 coPEN layers were $nx1=1.807$, $ny1=1.623$, $nz1=1.497$. These refractive index values, with associated low index optical material refractive index values, make Gold-822C strongly reflective for light in the block polarization state, and partially reflective for light in the pass polarization state.

Figure 13A:
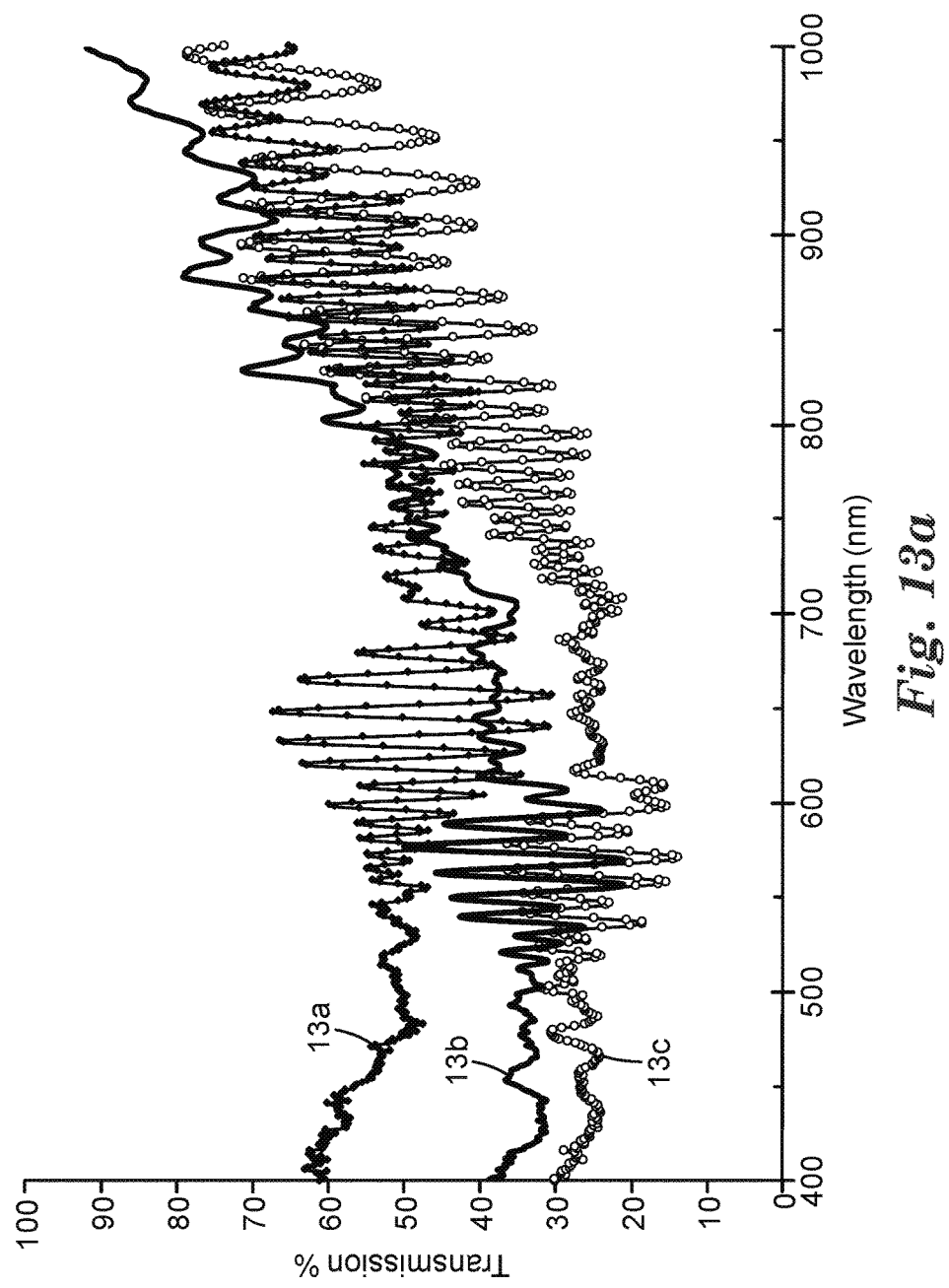
FIGS. 13a and 13b are graphs that show the measured pass state transmission spectra for Gold-822C in two configurations for Example 2.
Figure 13B:
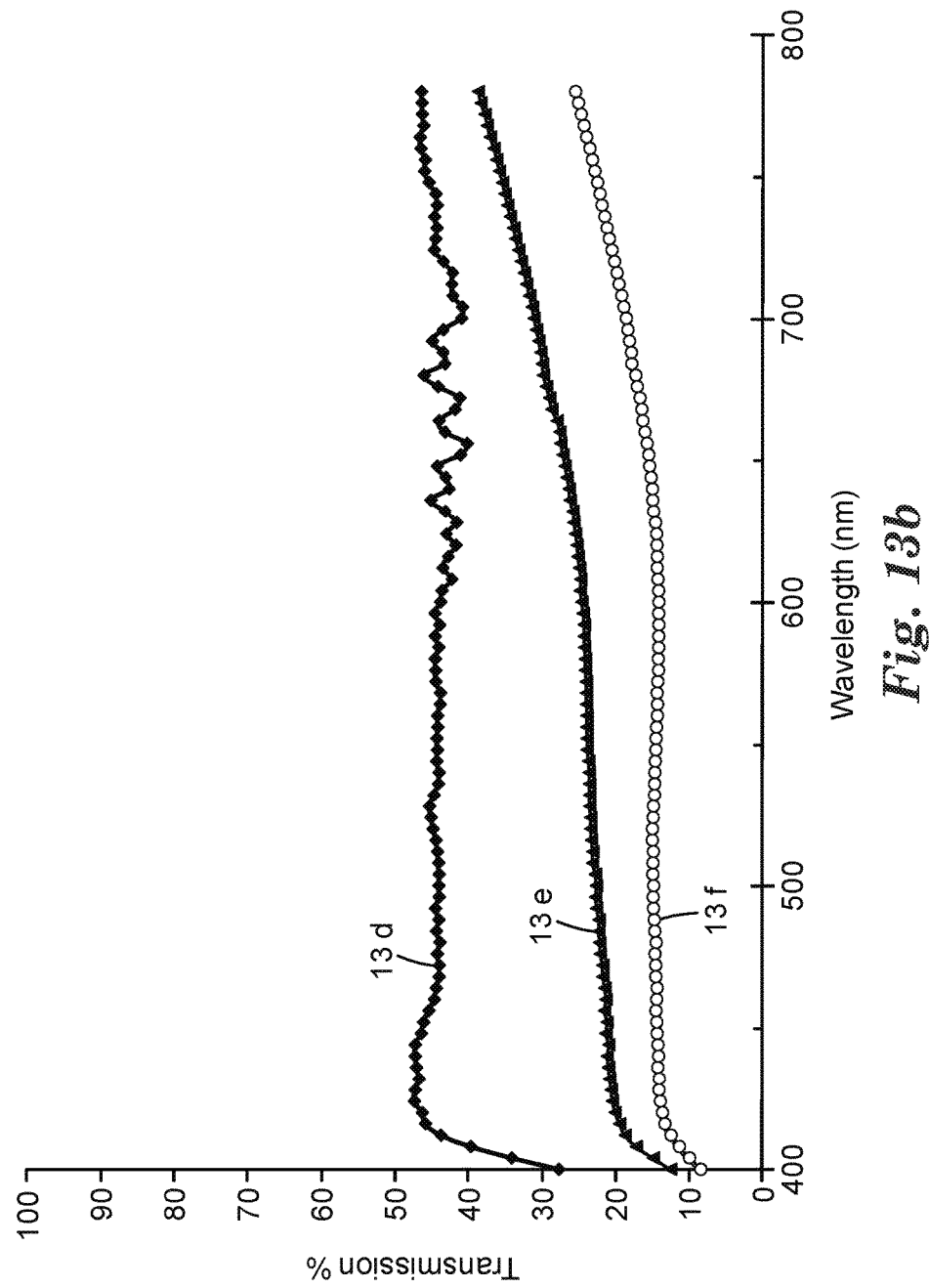

FIG. 13a shows the measured Pass state transmission spectra for Gold-822C in two configurations. Transmission spectra were measured for sample Gold-822C with no other films attached, for normal incidence pass state light (0) (Curve 13a) and for 50 degree angle incidence, for p-polarized pass state light (Curve 13b) and s-polarized pass state light (Curve 13c). Another set of transmission measurements are shown in FIG. 13b, for a sample consisting of a ULI diffuser film (see Table II) attached to the Gold-822C film, with a beaded gain diffuser, BGD, (e.g., OPALUS BS-702 beaded gain diffuser available from Keiwa Corp., Tokyo, JP) attached to the opposite side, with the ULI diffuser facing the light source. Normal incidence pass state light transmission for this 2-sided diffusive ABPR is shown (Curve 13d), and for 50 degree angle incidence, for p-polarized pass state light (Curve 13e) and s-polarized pass state light (Curve 13f).

We have analyzed the spectral slope (or lack of slope) by comparing the relative average values from each of the three visible wavelength bands, in the blue, the green and the red. Table VII shows the result of this characterization.

TABLE VII

|  | Sloped or constant | Color characteristic | Range among bin averages |
|---|---|---|---|
| 0 Pass Gold-822C | Constant | Neutral | 4% |
| 50P Pass Gold-822C | Constant | Neutral | 13% |
| 50S Pass Gold-822C | Constant | Neutral | 1% |
| 0 Pass ULI diffuser + Gold-822C + BGD | Constant | Neutral | 11% |
| 50P Pass ULI diffuser + Gold-822C + BGD | Constant | Neutral | 4% |
| 50S Pass ULI diffuser + Gold-822C + BGD | Constant | Neutral | 9% |

In this example, we used a commercially available LCD backlight with a series of "cool white" LEDs coupled into the edge of a standard light-guide plate configured with a scattering ink-dot extraction pattern. The light-guide plate had a white back reflector with a measured $R^b_{hemi}$ spectrum given in FIG. 8.

Using the backlight analysis discussed above, we can now calculate the backlight intensity spectra, using the measured spectra of $R^b_{hemi}(\lambda)$ $R^f_{hemi}(\lambda)$, and $T^{pol}(\Omega,\lambda)$. We then analyzed the backlight intensity spectra in order to determine color outcome for this backlight, overlaid with the front reflector of Example 2.

Figure 14:
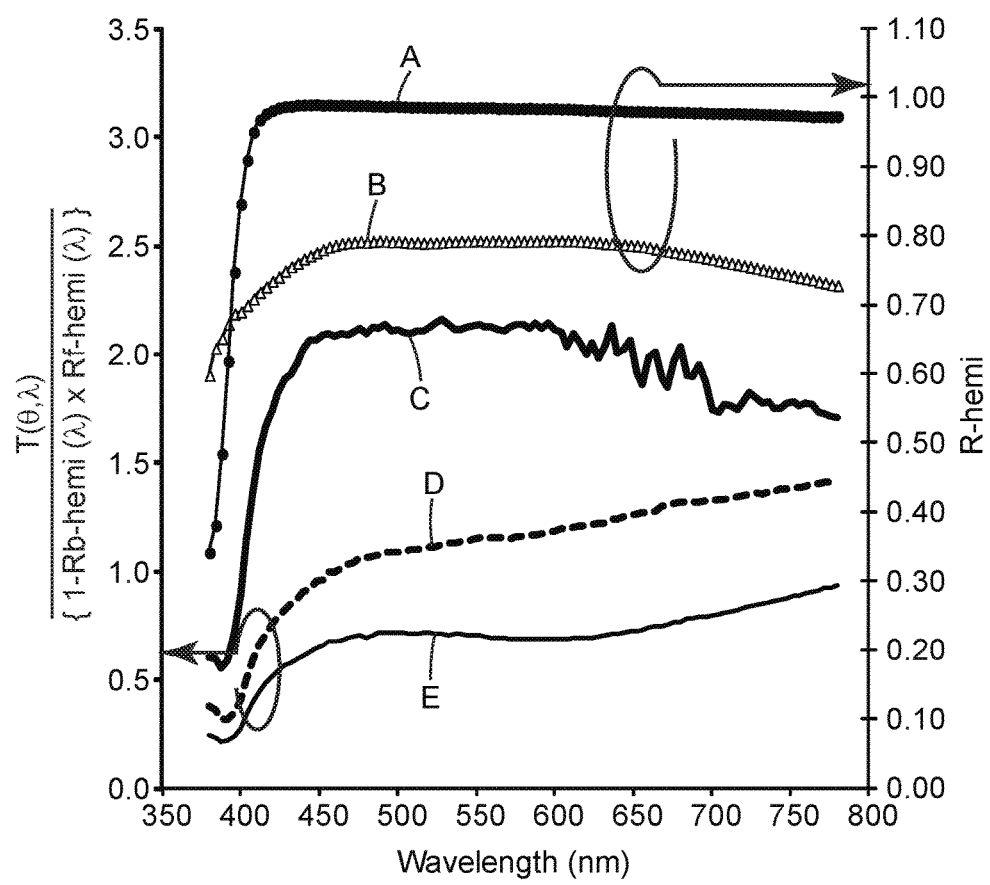
FIG. 14 is a graph of the measured spectra of $R^b_{hemi}(\lambda)$ for the backlight, and of the example front reflector $R^f_{hemi}(\lambda)$, of Example 2, and of the calculated backlight intensity spectra.

FIG. 14 shows the measured spectra of $R^b_{hemi}(\lambda)$ (curve A) for the backlight, and of the example front reflector $R^f_{hemi}(\lambda)$ (curve B), where the front reflector is the ABPR Gold-822C with attached ULI diffuser facing the light source and attached BGD facing away from the source. Note that the spectrum for $R^f_{hemi}(\lambda)$ has no significant slope of the visible wavelength region. Also plotted are backlight intensity spectra, calculated for the view angles 0 degrees (curve C), 50 degrees for p-polarized light propagating in the plane of incidence 122 of FIG. 2 (curve D), and 50 degrees for s-polarized light propagating in the plane of incidence 132 of plane 22 FIG. 2 (curve E).

We analyzed the spectral slope of the backlight intensity spectra by comparing the relative average values from each of the three visible wavelength bands, in the blue, the green and the red. Table VIII shows the result of this characterization.

TABLE VIII

|  | Sloped or constant | Color characteristic | Range among bin averages |
|---|---|---|---|
| Backlight Intensity 0 Pass | Constant | Neutral | 2% |
| Backlight Intensity 50P Pass | Sloped | Red | 16% |
| Backlight Intensity 50S Pass | Constant | Neutral | 3% |

A comparison of the results in Tables VII and VIII reveals again a surprising indication that despite the neutral transmission spectra for the front reflector at 50 degrees p-polarized pass light, the resultant recycling backlight intensity spectrum was calculated as being red-sloped. The other 50 degree view-angle backlight intensity spectra, along the orthogonal planes 24 and 22, is predicted to have a color neutral characteristic, corresponding to the front reflector transmission spectra slope characteristic at these view angles.

Figure 15A:
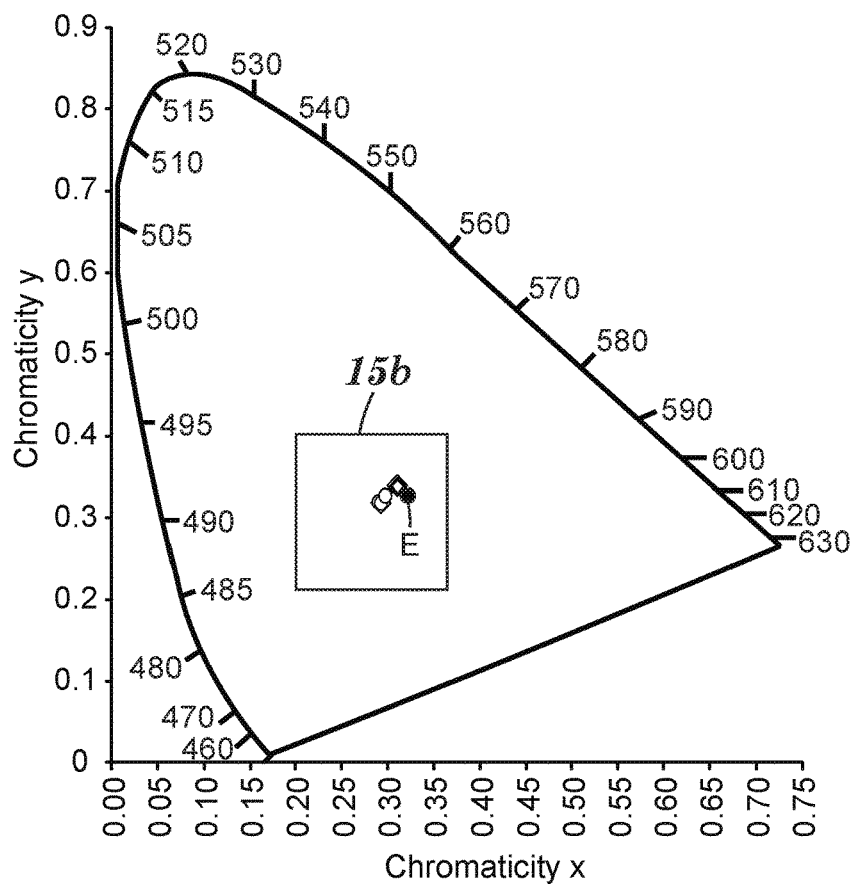
FIG. 15a is a graph of the chromaticity data for backlight emission of Example 2.
Figure 15B:
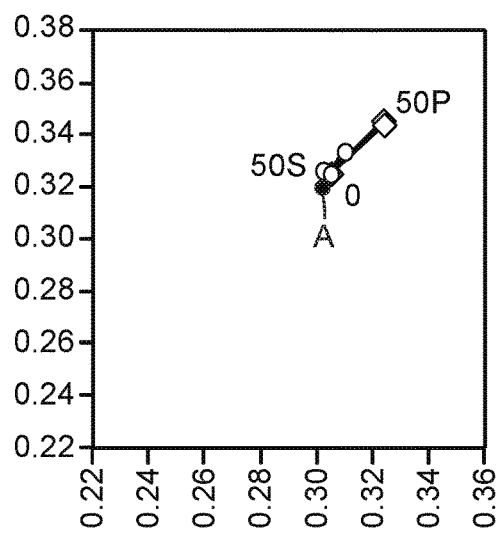

Finally, the backlight of Example 2, with front reflector Gold-822C with ULI-diffuser, and a BGD on the opposite side, was measured for spatial-average backlight emitted color, at the 0 degree and at the positive and negative 50 degree view angles for each of the p-polarized and s-polarized pass axes (labeled 50S and 50P). The chromaticity data for backlight emission is shown in FIGS. 15a and 15b.

The measurements of color emitted from the recycling backlight showed reddening at 50 degree p-polarized view angle and relatively neutral color for the other 50 degree view angle (s-polarization) and for normal angle. In addition to measured color coordinates of the backlight with the example front reflector, FIG. 15b, shows the color coordinate for the backlight, without the influence of the front reflector (point A).

Example 3

Gold-822F as Front Reflector on an Edge-Lit, Ink-Dot Extractor Light Guide Backlight The apodized broadband partial reflector (ABPR) with differing optical packets (See Ser. No. 61/549,614) of Example 3, was manufactured using the feedblock method described in U.S. Patent Application 61/332,401 entitled "Feedblock for Manufacturing Multilayer Polymeric Films," filed May 7, 2010. Two packets of 275 layers each of alternating low and high index polymer layers were coextruded as a cast web and then stretched in a tenter on a continuous film making line. The high index material was a 90/10 coPEN (90% naphthalate units and 10% terephthalate units). The low index material was differed between packet 1 and packet 2 of the microlayers. The low index material for packet 1 was a blend of PETg (EASTAR GN071 copolyester from Eastman Chemical, Kingsport, Tenn.) and an amorphous 55/45 coPEN (55% naphthalate units and 45% terephthalate units). The blend ratio was adjusted so as to obtain an index of 1.589. The low index material for packet 2 was TRITAN FX150 copolyester from Eastman Chemical, Kingsport, Tenn., and had a measured index of 1.554. All indices were measured at 633 nm. The 275 alternating microlayers in each packet were arranged in a sequence of ¼ wave layer pairs, where the thickness gradient of the layers was designed to provide a strong reflection resonance broadly and uniformly across bandwidth from approximately 400 nm to 1000 nm wavelength for one polarization axis, and a weaker reflection resonance for the orthogonal axis, with a smooth and blue-sloped transmission spectra. Five micrometer thick skin layers of PETg were disposed on the outside surfaces of the coherent alternating microlayer stack. The overall thickness of the film, including the alternating microlayers, the PBLs and the skin layers, was approximately 75 µm. This film was manufactured using the techniques described herein.

The birefringent refractive index values (measured at 633 nm) for the 90/10 coPEN layers were nx1=1.807, ny1=1.623, nz1=1.497. These refractive index values, with associated low index optical material refractive index values, make Gold-822F strongly reflective for light in the block polarization state, and partially reflective for light in the pass polarization state.

Figure 16A:
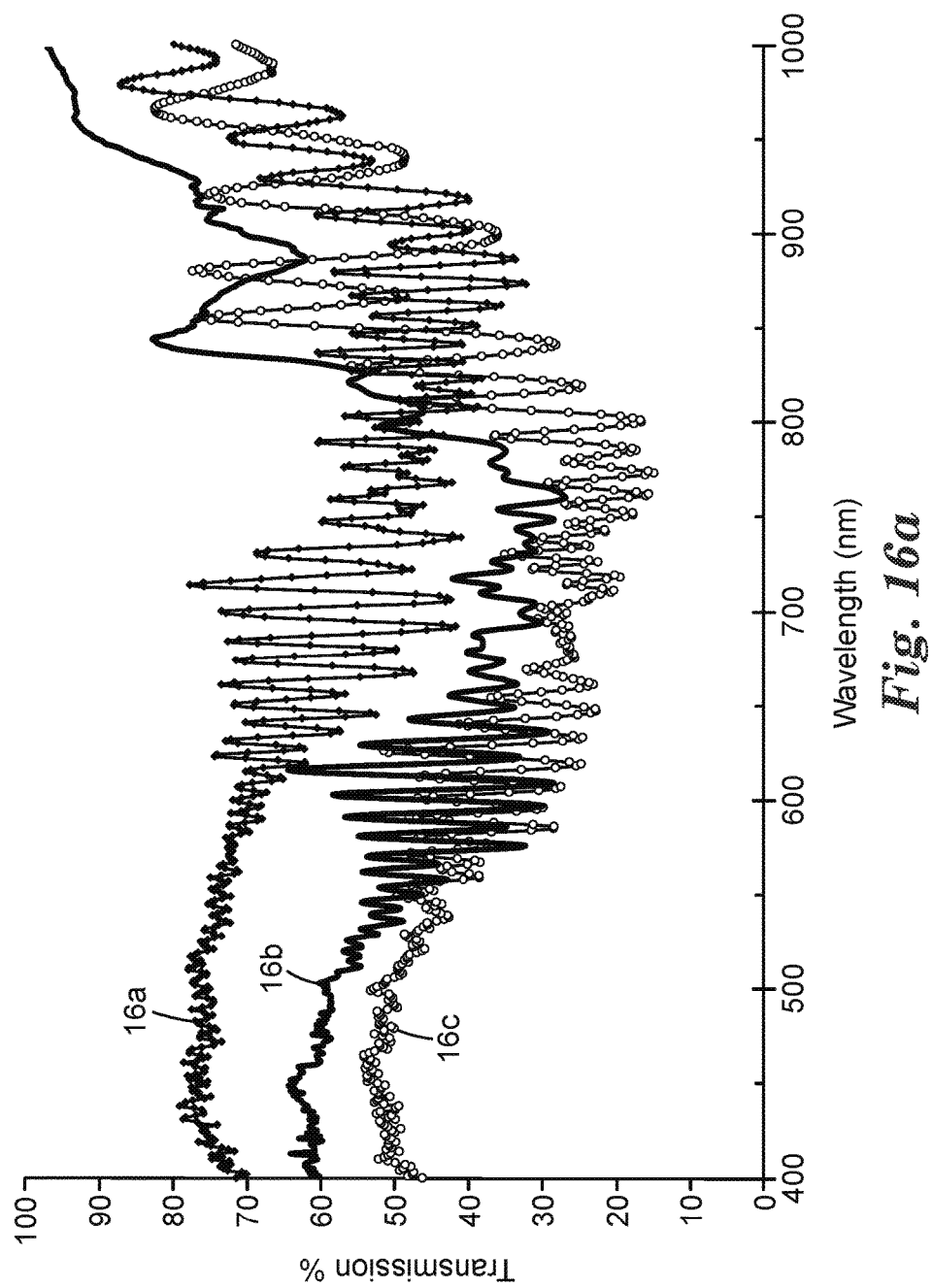
FIGS. 16a and 16b are graphs that show the measured pass state transmission spectra for Gold-822F in two configurations for Example 3, and of the calculated backlight intensity spectra.
Figure 16B:
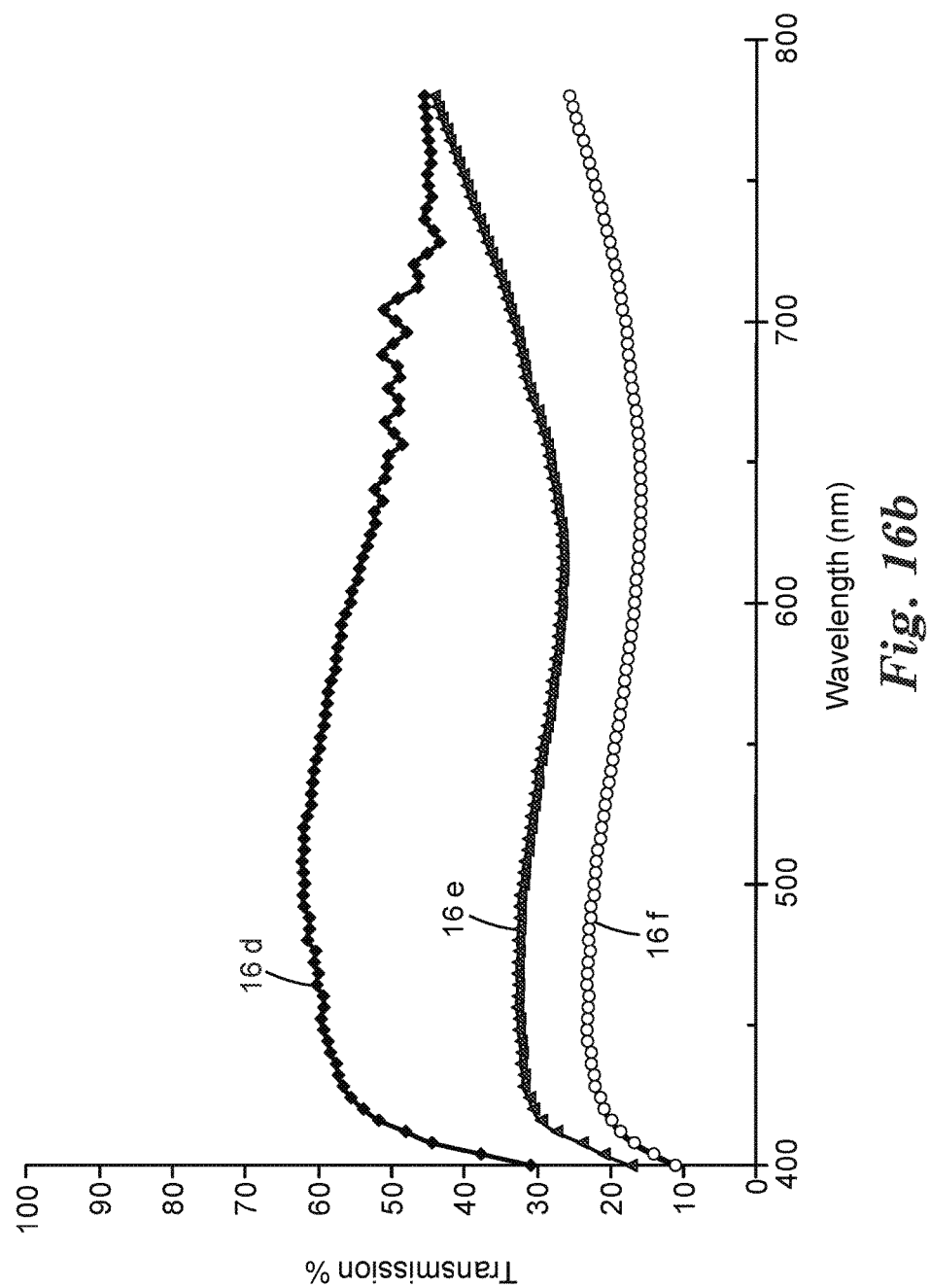

FIG. 16a shows the measured Pass state transmission spectra for Gold-822F in two configurations. Transmission spectra were measured for sample Gold 822F with no other films attached, for normal incidence pass state light (0) (Curve 16a) and for 50 degree angle incidence, for p-polarized pass state light (Curve 16b) and s-polarized pass state light (Curve 16c). Another set of transmission measurements are shown in FIG. 16b, for a sample consisting of a ULI diffuser film (see Table II) attached to the Gold-822F film, with a beaded gain diffuser attached to the opposite side, with the ULI diffuser facing the light source. Normal incidence pass state light transmission for this 2-sided diffusive ABPR is shown (Curve 16d), and for 50 degree angle incidence, for p-polarized pass state light (Curve 16e) and s-polarized pass state light (Curve 16f).

We analyzed the spectral slope (or lack of slope) by comparing the relative average values from each of the three visible wavelength bands, in the blue, the green and the red. Table IX shows the result of this characterization.

TABLE IX

| | Sloped or constant | Color characteristic | Range among bin averages |
|---|---|---|---|
| 0 Pass Gold-822F | Constant | neutral | 6% |
| 50P Pass Gold-822F | Sloped | Blue | 17% |
| 50S Pass Gold-822F | Sloped | Blue | 28% |
| 0 Pass ULI diffuser + Gold-822F + BGD | Constant | neutral | 9% |
| 50P Pass ULI diffuser + Gold-822F + BGD | Sloped | Blue | 32% |
| 50S Pass ULI diffuser + Gold-822F + BGD | Sloped | Blue | 30% |

In this example, we used a commercially available LCD backlight with a series of "cool white" LEDs coupled into the edge of a standard light-guide plate configured with a scattering ink-dot extraction pattern. The light-guide plate had a white back reflector with a measured $R^b_{hemi}$ spectrum given in FIG. 8.

Using the backlight analysis discussed above, we can now calculate the backlight intensity spectra, using the measured spectra of $R^b_{hemi}(\lambda)$, $R^f_{hemi}(\lambda)$, and $T^{pol}(\Omega,\lambda)$. We then analyze the backlight intensity spectra in order to determine color outcome for this backlight, overlaid with the front reflector of Example 3.

Figure 17:
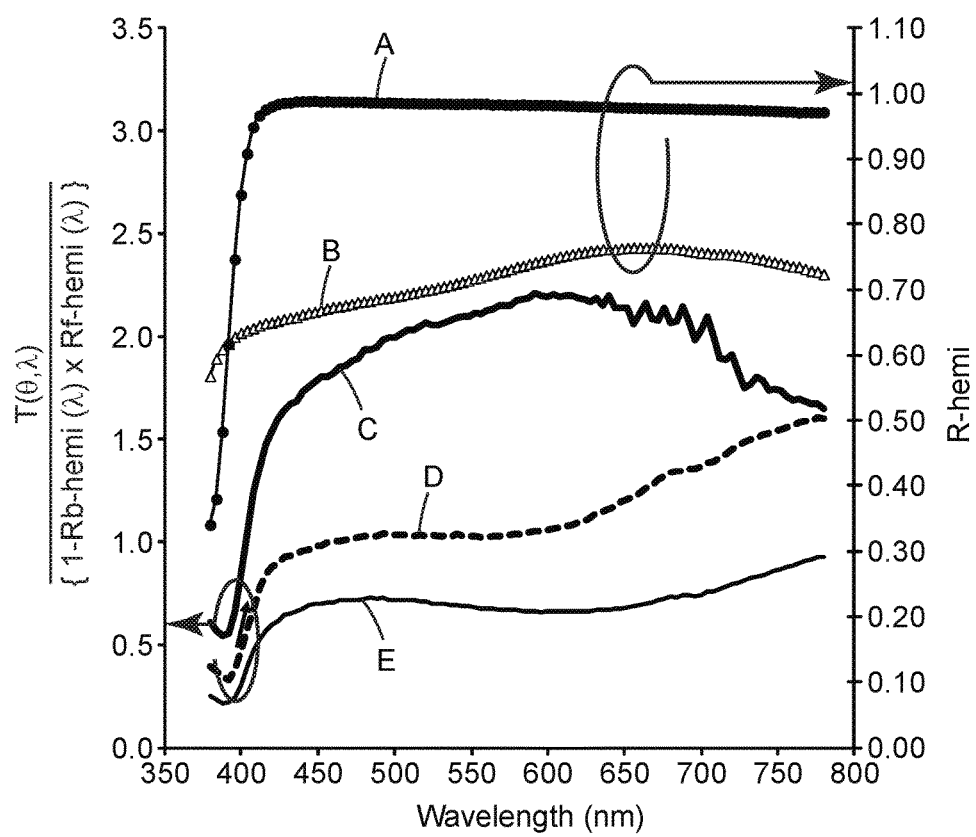
FIG. 17 is a graph of the measured spectra of $R^b_{hemi}(\lambda)$ for the backlight, and of the example front reflector $R^f_{hemi}(\lambda)$, of Example 3.

FIG. 17 shows the measured spectra of $R^b_{hemi}(\lambda)$ (curve A) for the backlight back reflector, and of the example front reflector $R^f_{hemi}(\lambda)$ (curve B), where the front reflector is the ABPR Gold-822F with attached ULI diffuser facing the light source and BGD attached to the opposite side. Note that the spectrum for $R^f_{hemi}(\lambda)$ was strongly sloped to the red side of the visible wavelength region. Also plotted are backlight intensity spectra, calculated for the view angles 0 degrees (curve C), 50 degrees for p-polarized light propagating in the plane of incidence 122 of FIG. 2 (curve D), and 50 degrees for s-polarized light propagating in the plane of incidence 132 of 22 FIG. 2 (curve E).

We analyzed the spectral slope of the calculated backlight intensity spectra by comparing the relative average values from each of the three visible wavelength bands, in the blue, the green and the red. Table X shows the result of this characterization.

TABLE X

| | Sloped or constant | Color characteristic | Range among bin averages |
|---|---|---|---|
| Backlight Intensity 0 Pass | Sloped | Red | 15% |
| Backlight Intensity 50P Pass | Constant | neutral | 5% |
| Backlight Intensity 50S Pass | Constant | neutral | 6% |

A comparison of the results in Tables IX and X revealed another surprising indication that despite the neutral transmission spectra for the front reflector at 0 degree pass light, the resultant recycling backlight intensity spectrum was calculated as being red-sloped. The other 50 degree view-angle backlight intensity spectra, along the orthogonal planes 24 and 22, are predicted to have a color neutral characteristic, despite the characterization of the front reflector transmission spectra being blue-sloped at these view angles.

Figure 18A:
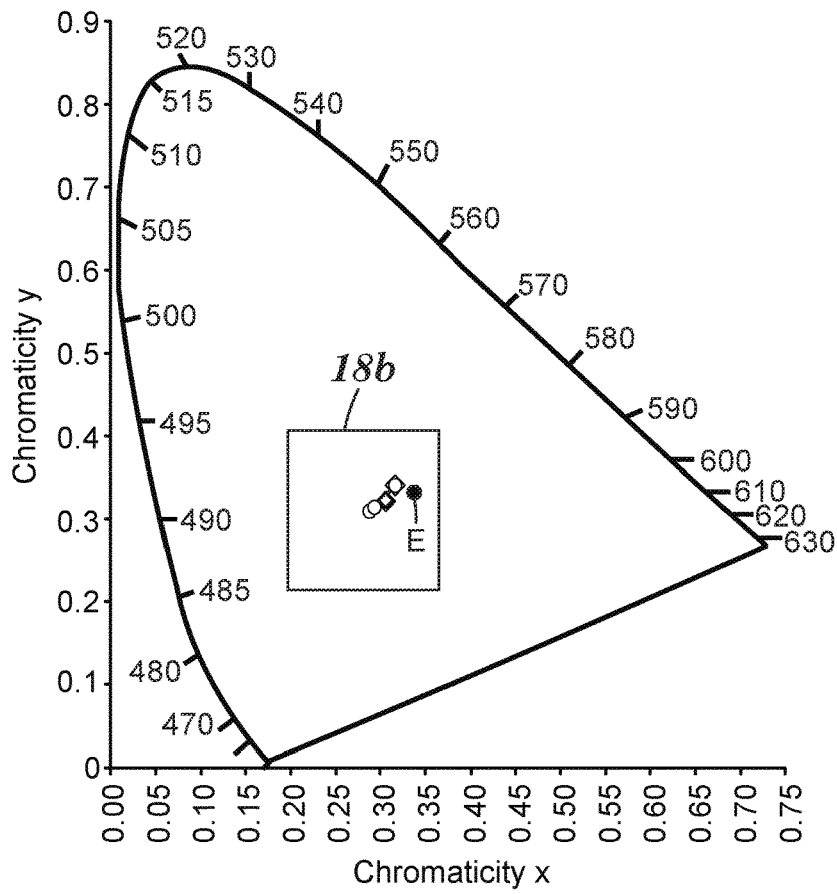
FIG. 18a is a graph of the chromaticity data for backlight emission of Example 3.
Figure 18B:
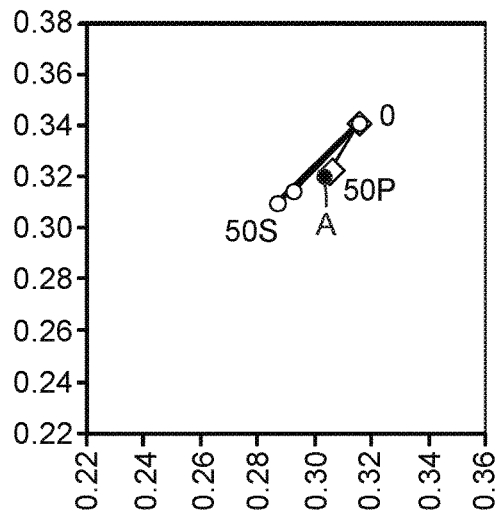

Finally, the backlight of Example 3, with front reflector Gold-822F with ULI diffuser, and a BGD on the opposite side, was measured for spatial-average backlight emitted color, at the 0 degree and at the positive and negative 50 degree view angles, for each of the p-polarized and s-polarized pass axes (labeled 50S and 50P). The chromaticity data for backlight emission is shown in FIGS. 18a and 18b.

The measurements of color emitted from the recycling backlight showed reddening at the normal angle view and relatively neutral color for both the 50 degree view angles (s-polarization and p-polarization). In addition to measured color coordinates of the backlight with the example front reflector, FIG. 18b shows the color coordinate for the backlight, without the influence of the front reflector (point A).

Example 4

Gold-15922 Laminated to APF as Front Reflector, on an Edge-Lit, Ink-Dot Extractor Light Guide Backlight Example 4 considered a laminate front reflector, including an apodized broadband partial reflectors (ABPR) with differing optical packets (see Ser. No. 61/549,614) laminated to a 3M Advanced Polarizer film (APF). Each film was manufactured using the feedblock method described in U.S. Patent Application 61/332,401 entitled "Feedblock for Manufacturing Multilayer Polymeric Films", filed May 7, 2010.

Considering the film Gold-15922: Two packets of 275 layers each of alternating low and high index polymer layers were coextruded as a cast web and then stretched in a length orienter followed by a tenter, on a continuous film making line. The high index material was PEN homopolymer. The low index material was the same for packet 1 and for packet 2 of the microlayers. The low index material for packet 1 and 2 was a blend of PETg (EASTAR GN071 copolyester from Eastman Chemical, Kingsport, Tenn.) and an amorphous 55/45 CoPEN (55% naphthalate units and 45% terephthalate units). The blend ratio was adjusted so as to obtain an index of 1.5905. All indices were measured at 633 nm.

Considering the APF film: a single packet of 275 layers of alternating low and high index polymer layers were coextruded as a cast web and then stretched in a parabolic stretch profile tenter, on a continuous film making line. The high index material was 90/10 coPEN (90% naphthalate units and 10% teraphthalate units). The low index material was SA115 copolyester from Eastman Chemical, Kingsport, Tenn. This amorphous polymer had an index of 1.570. All indices were measured at 633 nm.

For each of the reflective polarizing films of Example 4, the 275 alternating microlayers in each optical packet were arranged in a sequence of ¼ wave layer pairs, where the thickness gradient of the layers was designed to provide a strong reflection resonance broadly and uniformly across bandwidth from approximately 400 nm to 1100 nm wavelength for one polarization axis, and a weaker reflection resonance for the orthogonal axis, with a smooth and blue-sloped transmission spectra for the Gold-15922 film. Five micrometer thick skin layers of PETg were disposed on the outside surfaces of the coherent alternating microlayer stack. The overall thickness of the film, including the alternating microlayers, the PBLs and the skin layers, was approximately 105 µm, not including the optical adhesive used to laminate the two polarizing films together. This film was manufactured using the techniques described herein.

The birefringent refractive index values (measured at 633 nm) for the PEN layers in the Gold-15922 were nx1=1.794, ny1=1.690, nz1=1.495. These refractive index values, with associated low index optical material refractive index values, make Gold-15922 reflective for light in the block polarization state, and partially reflective for light in the pass polarization state.

The birefringent refractive index values (measured at 633 nm) for the 90/10 CoPEN layers in the APF were nx1=1.84, ny1=1.570, nz1=1.565. These refractive index values, with associated low index optical material refractive index values, make APF reflective for light in the block polarization state, and with no reflectivity for light in the pass polarization state. Please refer to FIG. 2 for details.

Figure 19A:
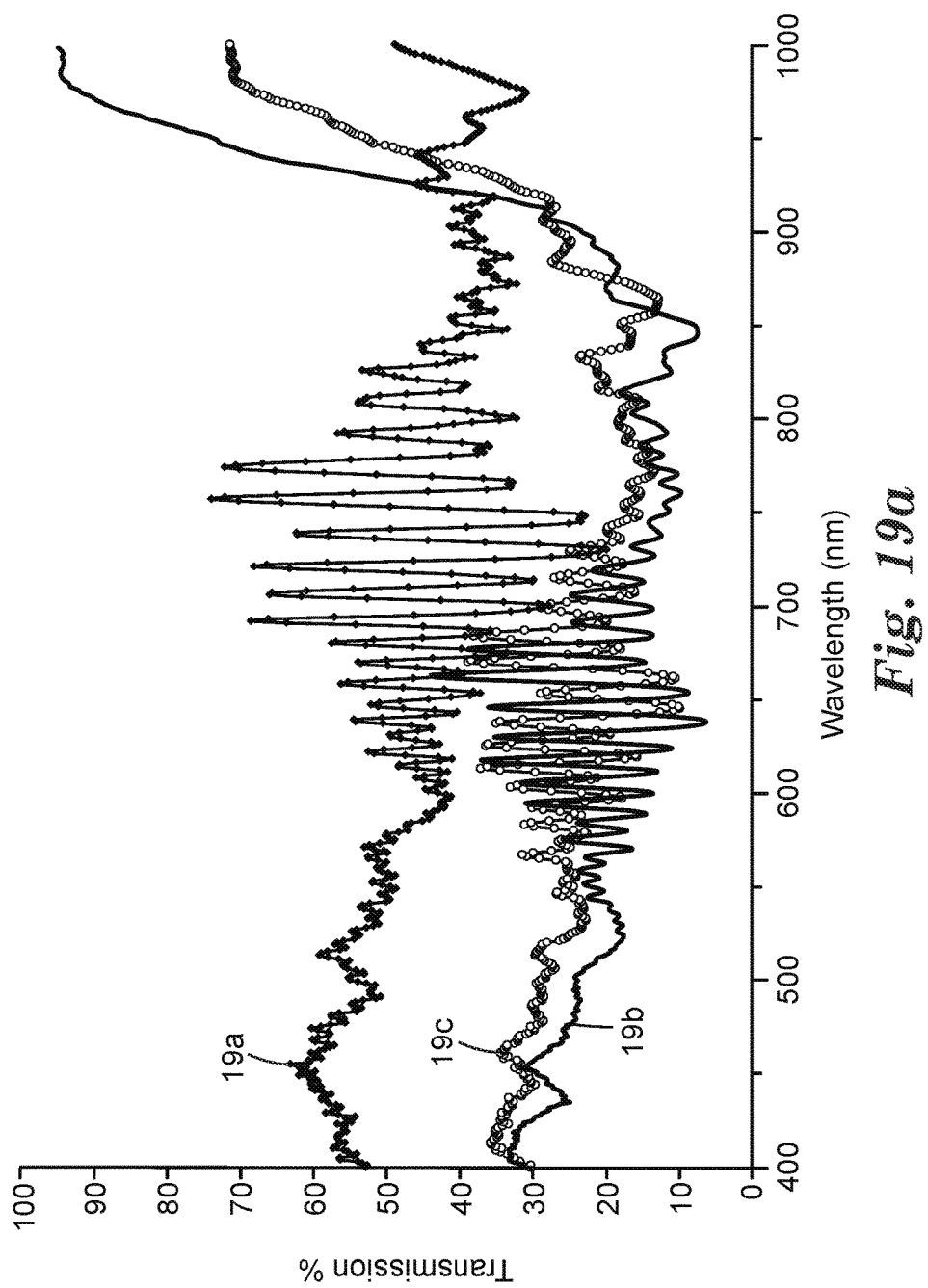
FIGS. 19a and 19b are graphs that show the measured pass state transmission spectra for Gold-15922 in two configurations for Example 4.
Figure 19B:
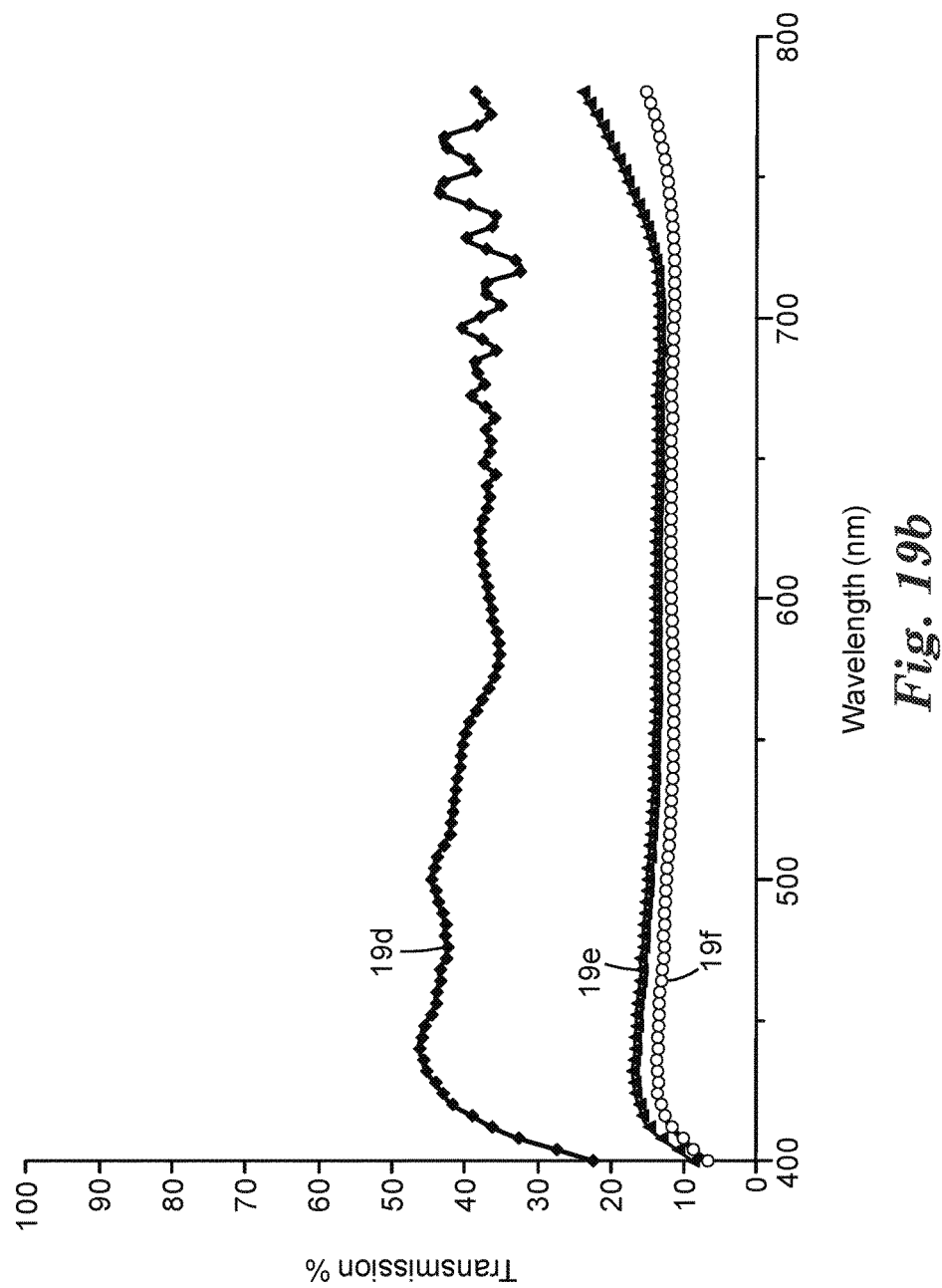

FIG. 19a shows the measured pass state transmission spectra for laminate Gold-15922+APF in two configurations. Transmission spectra were measured for the Example 4 front reflector laminate with no other films attached, for normal incidence pass state light (0) (Curve 19a) and for 50 degree angle incidence, for p-polarized pass state light (Curve 19b) and s-polarized pass state light (Curve 19c). Another set of transmission measurements are shown in FIG. 19b, for a sample consisting of a ULI diffuser film attached to the front reflector laminate film, with a beaded gain diffuser attached to the opposite side, (see Table II) with the ULI diffuser facing the light source. Normal incidence pass state light transmission for this 2-sided diffusive front reflector laminate is shown (Curve 19d), and for 50 degree angle incidence, for p-polarized pass state light (Curve 19e) and s-polarized pass state light (Curve 19f).

We analyzed the spectral slope (or lack of slope) by comparing the relative average values from each of the three visible wavelength bands, in the blue, the green and the red. Table XI shows the result of this characterization.

TABLE XI

|  | Sloped or constant | Color characteristic | Range among bin averages |
|---|---|---|---|
| 0 Pass Gold-15922 + APF | Sloped | Blue | 18% |
| 50P Pass Gold-15922 + APF | Constant | neutral | 15% |
| 50S Pass Gold-15922 + APF | Constant | neutral | 12% |
| 0 Pass ULI diffuser + Gold-15922 + APF + BGD | Sloped | Blue | 23% |
| 50P Pass ULI diffuser + Gold-15922 + APF + BGD | Sloped | Blue | 30% |
| 50S Pass ULI diffuser + Gold-15922 + APF + BGD | Sloped | Blue | 23% |

In this Example 4, we used a commercially available LCD backlight with a series of "cool white" LEDs coupled into the edge of a standard light-guide plate configured with a scattering ink-dot extraction pattern. The light-guide plate had a white back reflector characterized with the measured $R^b_{hemi}$ spectrum given in FIG. 8.

Using the backlight analysis discussed above, we can now calculate the backlight intensity spectra, using the measured spectra of $R^b_{hemi}(\lambda)$, $R^f_{hemi}(\lambda)$, and $T^{pol}(\Omega,\lambda)$. We then analyzed the backlight intensity spectra in order to determine color outcome for this backlight, overlaid with the front reflector of Example 4.

Figure 20:
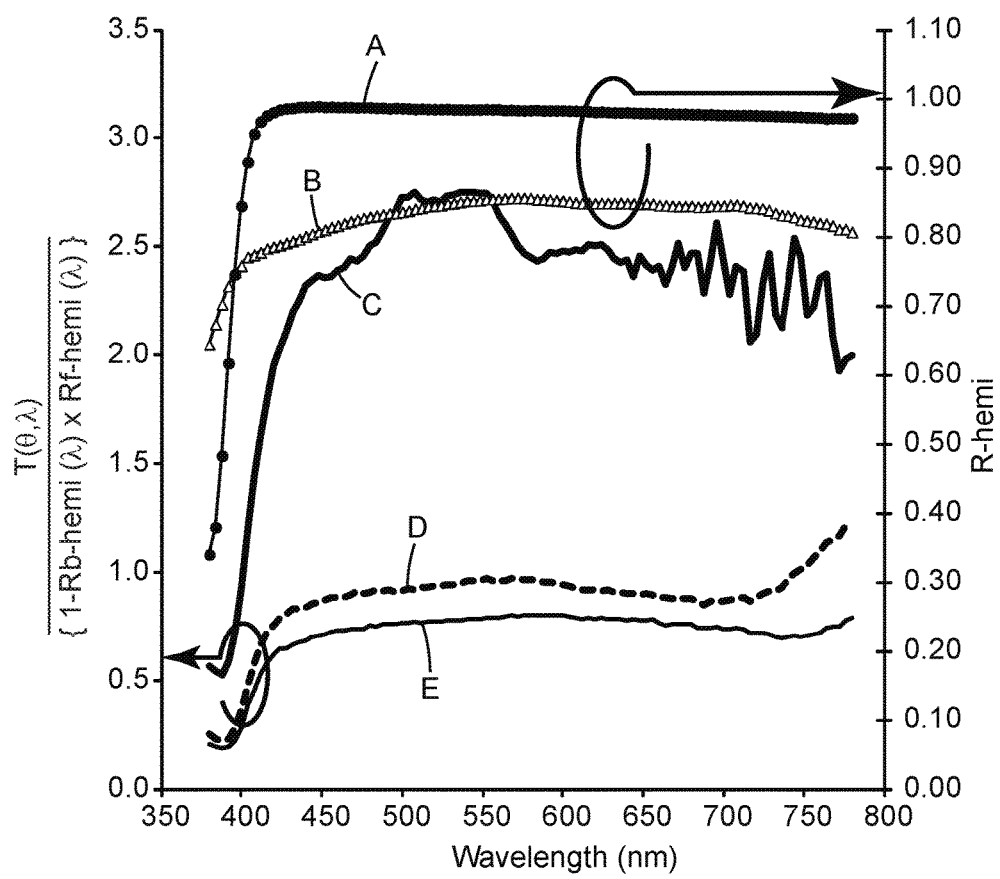
FIG. 20 is a graph of the measured spectra of $R^b_{hemi}(\lambda)$ for the backlight, and of the example front reflector $R^f_{hemi}(\lambda)$ of Example 4, and of the calculated backlight intensity spectra.

FIG. 20 shows the measured spectra of $R^b_{hemi}(\lambda)$ (curve A) for the backlight, and of the example front reflector $R^f_{hemi}(\lambda)$ (curve B), where the front reflector was the laminate Gold-15922+APF, with attached ULI diffuser facing the light source, and an attached BGD on the opposite side. Note that the spectrum for $R^f_{hemi}(\lambda)$ was weakly sloped to the red side of the visible wavelength region. Also plotted are backlight intensity spectra, calculated for the view angles 0 degrees (curve C), 50 degrees for P-polarized light propagating in the plane of incidence 122 of FIG. 2 (curve D), and 50 degrees for S-polarized light propagating in the plane of incidence 132 of FIG. 2.

We analyzed the spectral slope of the backlight intensity spectra by comparing the relative average values from each of the three visible wavelength bands, in the blue, the green and the red. Table XII shows the result of this characterization.

TABLE XII

|  | Sloped or constant | Color characteristic | Range among bin averages |
|---|---|---|---|
| Backlight Intensity 0 Pass | Constant | neutral | 6% |
| Backlight Intensity 50P Pass | Constant | neutral | 5% |
| Backlight Intensity 50S Pass | Constant | neutral | 6% |

A comparison of the results in Tables XI and XII revealed another surprising indication that even with a blue-sloped front reflector transmission spectra, the resultant recycling backlight intensity spectra were all calculated as neutral in color.

Figure 21A:
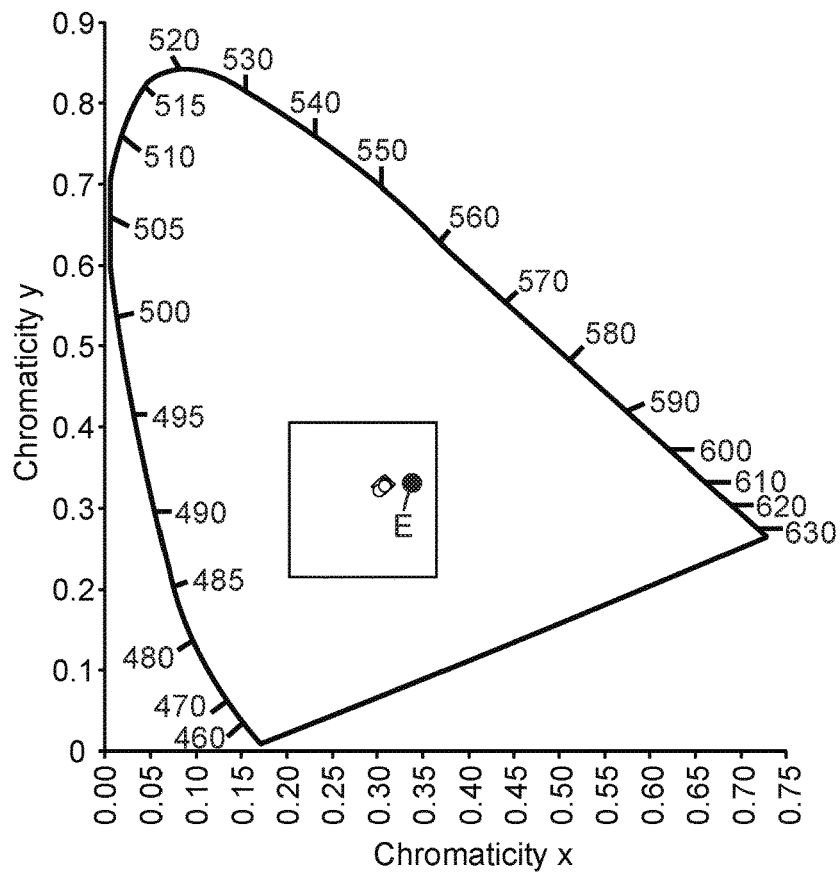
FIG. 21a is a graph of the chromaticity data for backlight emission of Example 4.
Figure 21B:
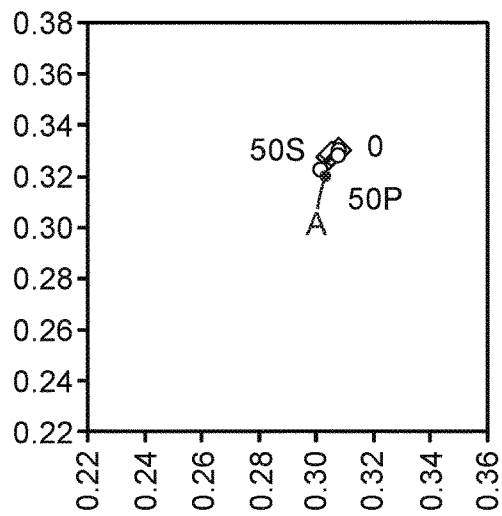

Finally, the backlight of Example 4, with laminate front reflector including a ULI diffuser and a BGD on the opposite side, was measured for spatial-average backlight emitted color, at the 0 degree and at the positive and negative 50 degree view angles, for each of the p-polarized and s-polarized pass axes (labeled 50S and 50P). The chromaticity data for backlight emission is shown in FIGS. 21a and 21b.

The measurements of color emitted from the recycling backlight showed neutral color at all of the characterized view angles. In addition to measured color coordinates of the backlight with the example front reflector, FIG. 21b shows the color coordinate for the backlight, without the influence of the front reflector (point A).

Thus, embodiments of ILLUMINATION SYSTEM WITH SLOPED TRANSMISSION SPECTRUM FRONT REFLECTOR are disclosed. One skilled in the art will appreciate that the optical films and film articles described herein can be practiced with embodiments other than those disclosed. The disclosed embodiments are presented for purposes of illustration and not limitation.

What is claimed is:

1. A backlight comprising:
    a front and back reflector forming a light recycling cavity, the front reflector being partially reflective to provide an output illumination area;
    one or more light sources disposed to emit light into the light recycling cavity;
    wherein the front reflector has a blue sloped transmission spectrum, at normal incidence, with a range among bin values from 15% to 100%.
2. A backlight according to claim 1, wherein the front reflector has a blue-sloped transmission spectrum, at normal incidence, with a range among bin values from 15% to 50%.
3. A backlight according to claim 1, wherein the front reflector comprises a polarizer.
4. A backlight according to claim 1, wherein the front reflector comprises a reflective polarizer.
5. A backlight according to claim 1, wherein the backlight illuminates a liquid crystal display panel.
6. A backlight according to claim 4, wherein the front reflector comprises an absorbing polarizer.

* * * * *